(12) United States Patent
Agiwal

(10) Patent No.: US 11,956,709 B2
(45) Date of Patent: *Apr. 9, 2024

(54) METHOD AND APPARATUS OF SYSTEM INFORMATION (SI) CHANGE NOTIFICATION ON UNLICENSED CARRIER

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,300

(22) Filed: Nov. 14, 2022

(65) Prior Publication Data

US 2023/0075972 A1    Mar. 9, 2023

Related U.S. Application Data

(63) Continuation of application No. 17/323,384, filed on May 18, 2021, now Pat. No. 11,503,535, which is a
(Continued)

(51) Int. Cl.
*H04W 48/10* (2009.01)
*H04W 76/28* (2018.01)

(52) U.S. Cl.
CPC .......... *H04W 48/10* (2013.01); *H04W 76/28* (2018.02)

(58) Field of Classification Search
None
See application file for complete search history.

(56) References Cited

U.S. PATENT DOCUMENTS 10,028,329 B2    7/2018  Vajapeyam et al.
10,455,621 B2   10/2019  Agiwal et al.
(Continued)

FOREIGN PATENT DOCUMENTS

CN    107948950 A    4/2018
CN    108605268 A    9/2018
(Continued)

OTHER PUBLICATIONS

Indian Office Action dated Jan. 5, 2023, issued in Indian Patent Application No. 202137018512.
(Continued)

*Primary Examiner* — Hong S Cho
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for Internet of things (IoT) are provided. The communication method and system include intelligent services based on the 5G communication technology and the IoT-related technology, such as a smart home, a smart building, a smart city, a smart car, a connected car, health care, digital education, smart retail, security and safety services. A method performed by a base station for transmitting a paging message is provided. The method includes determining a number of paging frames (PFs) in a discontinuous reception (DRX) cycle based on information on paging search space, transmitting, to a terminal, information on the number of PFs in system information block 1 (SIB1), identifying at least one PF based on the number of PFs, and transmitting, to the terminal, at least one paging message in the at least one PF.

20 Claims, 15 Drawing Sheets

Related U.S. Application Data continuation of application No. 16/670,206, filed on Oct. 31, 2019, now Pat. No. 11,012,921.

(60) Provisional application No. 62/753,309, filed on Oct. 31, 2018.

(56) References Cited

U.S. PATENT DOCUMENTS

| | | | |
|---|---|---|---|
| 10,952,275 | B2 | 3/2021 | Zhang et al. |
| 11,343,792 | B2 | 5/2022 | Phan et al. |
| 11,363,587 | B2 * | 6/2022 | Bi ................ H04W 68/005 |
| 11,696,254 | B2 * | 7/2023 | Rune ............. H04L 5/0053 |
| | | | 370/329 |
| 2010/0272037 | A1 | 10/2010 | Lee et al. |
| 2017/0303235 | A1 | 10/2017 | Deogun et al. |
| 2017/0303236 | A1 | 10/2017 | Sun et al. |
| 2017/0367069 | A1 | 12/2017 | Agiwal et al. |
| 2018/0242277 | A1 | 8/2018 | Liu et al. |
| 2018/0324750 | A1 | 11/2018 | Byun et al. |
| 2019/0082490 | A1 | 3/2019 | Zhang et al. |
| 2019/0104498 | A1 * | 4/2019 | Jung ............. H04W 68/005 |
| 2019/0223086 | A1 | 7/2019 | Jung et al. |
| 2019/0223094 | A1 | 7/2019 | Ingale et al. |
| 2020/0280957 | A1 | 9/2020 | Gao et al. |
| 2021/0337502 | A1 | 10/2021 | Phan et al. |

FOREIGN PATENT DOCUMENTS

| | | |
|---|---|---|
| CN | 108702731 A | 10/2018 |
| CN | 109479236 A | 3/2019 |
| EP | 3454623 A1 | 3/2019 |
| KR | 10-1461971 B1 | 11/2014 |
| WO | 2017-078323 A1 | 5/2017 |
| WO | 2017/194006 A1 | 11/2017 |
| WO | 2018/016922 A1 | 1/2018 |
| WO | 2018/045307 A1 | 3/2018 |

OTHER PUBLICATIONS

European Office Action dated May 3, 2023, issued in European Patent Application No. 19879633.6.

International Search Report dated Feb. 10, 2020, issued in an International Application No. PCT/KR2019/014642.

Huawei et al., 'PO/PF calculation for non-default association', R2-1810365, 3GPP TSG-RAN WG2 #AH-1807, Jun. 22, 2018. See pp. 1-4.

ZTE Corporation et al., 'CR on PDCCH monitoring occasions for paging', R2-1814030, 3GPP TSG-RAN2 Meeting #103bis, Sep. 27, 2018. See pp. 1, 3.

Huawei et al., 'PO/PF calculation for default association', R2-1808395, 3GPP TSG-RAN WG2 #102, May 11, 2018. See pp. 1-2, 4; and figure 1.

CATT, 'Necessity of Adding an Offset when Calculating PF', R2-1811249, 3GPP TSG-RAN WG2 Meeting #103, Aug. 10, 2018. See pp. 1-3.

European Extended Search Report dated Nov. 12, 2021, issued in a counterpart European Application No. 19879633.6-1212 / 3858006.

LG Electronics Inc., Remaining issues for PO, 3GPP TSG RAN WG2 #103bis, R2-1815337, Sep. 28, 2018.

Mediatek Inc., Paging Frame and Paging Occasion Calculation in NR, 3GPP TSG RAN WG2 #102, R2-1807743, May 11, 2018.

Qualcomm Incorporated, Report of Email Discussion [101bis#67][NR] PO/PF calculation, 3GPP TSG RAN WG2 #102, R2-1806885, May 14, 2018.

Vivo, Not introduce for first PDCCH monitoring occasion indication for paging, 3GPP TSG RAN WG2 #103, R2-1811769, Aug. 10, 2018.

Japanese Office Action dated Jul. 25, 2023, issued in Japanese Patent Application No. 2021-523456.

Ericsson, CR to support frequency-multiplexed paging occasions, R2-1809620, 3GPP TSG-RAN WG2 AH 1807, Jun. 26, 2018.

Chinese Office Action dated Oct. 20, 2023, issued in Chinese Patent Application No. 201980071687.9.

Huawei et al., Offline summary for AI 7.1.1.1 on Paging, 3GPP TSG RAN WG1 Meeting #94bis, R1-1811900, Oct. 10, 2018.

Japanese Notice of Allowance dated Feb. 13, 2024, issued in Japanese Patent Application No. 2021-523456.

* cited by examiner

METHOD AND APPARATUS OF SYSTEM INFORMATION (SI) CHANGE NOTIFICATION ON UNLICENSED CARRIER

CROSS-REFERENCE TO RELATED APPLICATION(S)

This application is a continuation application of prior application Ser. No. 17/323,384, filed on May 18, 2021, which will be issued as U.S. Pat. No. 11,503,535 on Nov. 15, 2022; which is a continuation application of prior application Ser. No. 16/670,206, filed on Oct. 31, 2019, which has issued as U.S. Pat. No. 11,012,921 on May 18, 2021; which is based on and claimed priority under 35 U.S.C. § 119(e) of a U.S. Provisional application Ser. No. 62/753,309, filed on Oct. 31, 2018 in the U.S. Patent and Trademark Office, the disclosure of which is incorporated by reference herein in its entirety.

BACKGROUND

1. Field

The disclosure relates to a system and a method of system information (SI) change notification on unlicensed carrier.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands, but also in higher frequency (mmWave) bands, e.g., 10 GHz to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports the voice service and data service. The 4G wireless communication system has been developed to provide high-speed data service. However, the 4G wireless communication system currently suffers from lack of resources to meet the growing demand for high-speed data services. Therefore, the 5G wireless communication system is being developed to meet the growing demand of various services with diverse requirements, e.g., high-speed data services, support ultra-reliability and low latency applications.

In addition, the 5G wireless communication system is expected to address different use cases having quite different requirements in terms of data rate, latency, reliability, mobility etc. However, it is expected that the design of the air-interface of the 5G wireless communication system will be flexible enough to serve user equipments (UEs) having quite different capabilities depending on the use case and market segment in which the UE caters service to the end customer. Example use cases the 5G wireless communication system is expected to address includes enhanced mobile broadband (eMBB), massive Machine Type Communication (m-MTC), ultra-reliable low latency communication (URLL), etc. The eMBB requirements (e.g. tens of Gbps data rate, low latency, high mobility and so on) address the market segment representing the wireless broadband subscribers needing internet connectivity everywhere, all the time, and on the go. The m-MTC requirements (e.g., very high connection density, infrequent data transmission, very long battery life, low mobility address and so on) address the market segment representing the IoT/IoE envisioning connectivity of billions of devices. The URLL requirements (e.g., very low latency, very high reliability, variable mobility, and so forth) address the market segment representing the Industrial automation application and vehicle-to-vehicle/vehicle-to-infrastructure communication that is foreseen as one of the enablers for autonomous cars.

In the wireless communication system, a next generation node B (gNB) or base station in cell broadcasts the SI. The SI includes common parameters needed to communicate in cell. In the 5G wireless communication system (also referred as next generation radio or NR), the SI is divided into the master information block (MIB) and a number of SI blocks (SIBs).

A MIB may be transmitted on the broadcast channel (BCH) with a periodicity of 80 ms and repetitions made within 80 ms. The MIB includes parameters that are needed to acquire SIB1 from the cell.

An SIB1 may be transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB.

SIBs other than SIB1 are carried in SI messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. In the SI-window, a UE monitors the physical downlink control channel (PDCCH) at monitoring occasions (i.e. symbols/slots) that are configured for SI message reception. For SI message acquisition, PDCCH monitoring occasion(s) are determined according to an osi-searchSpace. If the osi-searchSpace is set to zero (also referred as default association), PDCCH monitoring occasions for SI message reception in SI-Window are same as PDCCH monitoring occasions for SIB1. If the osi-searchSpace is not set to zero (also referred as non-default association), PDCCH monitoring occasions for SI message are determined based on search space indicated by the osi-searchSpace. In the frequency domain, bandwidth (or control resource set (CORESET)) for SI message reception is located in the initial downlink bandwidth part (DL BWP).

An SI broadcasted in a cell can be updated. To update the SI, a modification period is used. When a modification period is used, i.e. updated SI (other than for earthquake and tsunami warning system (ETWS) and commercial mobile alert system (CMAS)) is broadcasted in the modification period following an SI change indication. If the SI change indication is sent by a gNB in modification period N, then the updated SI is broadcasted from modification period N+1. The modification period boundaries are defined by system frame number (SFN) values for which SFN mod m=0, where m is the number of radio frames comprising the modification period. The modification period is configured by SI. The UE receives indications about SI modifications and/or public warning system (PWS) notifications using a short message transmitted with a paging radio network temporary identifier (P-RNTI) over a downlink control information (DCI). Within a modification period, an SI change indication and/or a PWS notification can be repeated multiple times. Each modification period includes multiple default discontinuous reception (DRX) cycles. An SI change indication and/or PWS notification is transmitted in each paging occasion (PO) of a default DRX cycle, so that each UE can receive the SI change indication and/or PWS notification.

UEs in RRC_IDLE or in RRC_INACTIVE monitor for SI change indication in its own PO every DRX cycle. UEs in RRC_CONNECTED monitor for SI change indication in any PO at least once per modification period if the UE is provided with common search space to monitor paging. ETWS or CMAS capable UEs in RRC_IDLE or in RRC_INACTIVE monitor for indications about PWS notification in its own PO every DRX cycle. ETWS or CMAS capable UEs in RRC_CONNECTED monitor for indication about PWS notification in any PO at least once per modification period if the UE is provided with common search space to monitor paging.

Issue:

In case of an unlicensed spectrum, the gNB needs to determine whether the channel is free before transmitting the SI change indication or PWS notification in a modification period. If the channel is not free, the gNB cannot transmit the SI change indication. So it is possible that an SI change indication is not transmitted in each PO of a default DRX cycle.

FIG. 1 shows an example where SI change indication is not transmitted in a second PO (i.e., PO2) of a DRX cycle because of a listen before talk (LBT) failure according to related art.

As a result, UEs that are monitoring PO2 will not receive the SI change indication.

So an enhanced method of SI change indication and/or PWS notification is needed.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

In case of an unlicensed spectrum, the next generation node B (gNB) needs to determine whether the channel is free before transmitting the system information (SI) change indication or public warning system (PWS) notification in a modification period. If the channel is not free, the gNB cannot transmit SI change indication. So it is possible that an SI change indication is not transmitted in each paging occasion (PO) of a default discontinuous reception (DRX) cycle. As a result, some user equipment(s) (UE(s)) may fail to receive SI change indication and SI used by UE(s) and gNB will be different which affects the communication between UE and gNB. So an enhanced method of SI change indication and/or PWS notification is needed.

According to current paging design, the number of paging frames (PFs) (N) in the DRX cycle can be configurable. The gNB can select any value from {T, T/2, T/4, T/8 and T/16}. The issue is that when the gNB wants to transmit physical downlink control channel (PDCCH) for paging in the same occasions where the PDCCH for system information block 1 (SIB1) (or remaining minimum system information (RMSI)) is also transmitted, selecting any value from {T, T/2, T/4, T/8 and T/16} would be in efficient. The PFs may not align with radio frames in which PDCCH for SIB1 (or RMSI) is transmitted. So an efficient way of selecting value of N is needed.

In accordance with an aspect of the disclosure, a method performed by a base station for transmitting a paging message is provided. The method includes determining a number of paging frames (PFs) in a discontinuous reception (DRX) cycle based on information on paging search space, transmitting, to a terminal, information on the number of PFs in system information block 1 (SIB1), identifying at least one PF based on the number of PFs, and transmitting, to the terminal, at least one paging message in the at least one PF.

In accordance with another aspect of the disclosure, a base station in a wireless communication system is provided. The base station includes a transceiver and at least one processor. The at least one processor is configured to determine a number of paging frames (PFs) in a discontinuous reception (DRX) cycle based on information on paging search space, transmit, to a terminal via the transceiver, information on the number of PFs in system information block 1 (SIB1), identify at least one PF based on the number of PFs, and transmit, to the terminal via the transceiver, at least one paging message in the at least one PF.

In accordance with another aspect of the disclosure, a method performed by a terminal for receiving a paging message is provided. The method includes receiving, from a base station, information on a number of paging frames (PFs) in a discontinuous reception (DRX) cycle in system information block 1 (SIB1), identifying at least one PF based on the number of PFs, and receiving, from the base station, at least one paging message in the at least one PF. The number of PFs is identified based on information on paging search space.

In accordance with another aspect of the disclosure, A terminal in a wireless communication system is provided. The terminal includes a transceiver and at least one processor. The at least one processor is configured to receive, from a base station via the transceiver, information on a number of paging frames (PFs) in a discontinuous reception (DRX) cycle in system information block 1 (SIB1), identify at least one PF based on the number of PFs, and receive, from the base station via the transceiver, at least one paging message in the at least one PF. The number of PFs is identified based on information on paging search space.

In case of unlicensed spectrum, mechanisms have been provided in the disclosure so that UE does not miss the SI change indication and/or PWS notification. Mechanisms have also been provided in the disclosure to select the number of PFs (N) to be configured in paging configuration so that PF can be aligned with frames in which SIB1 (or RMSI) is transmitted.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
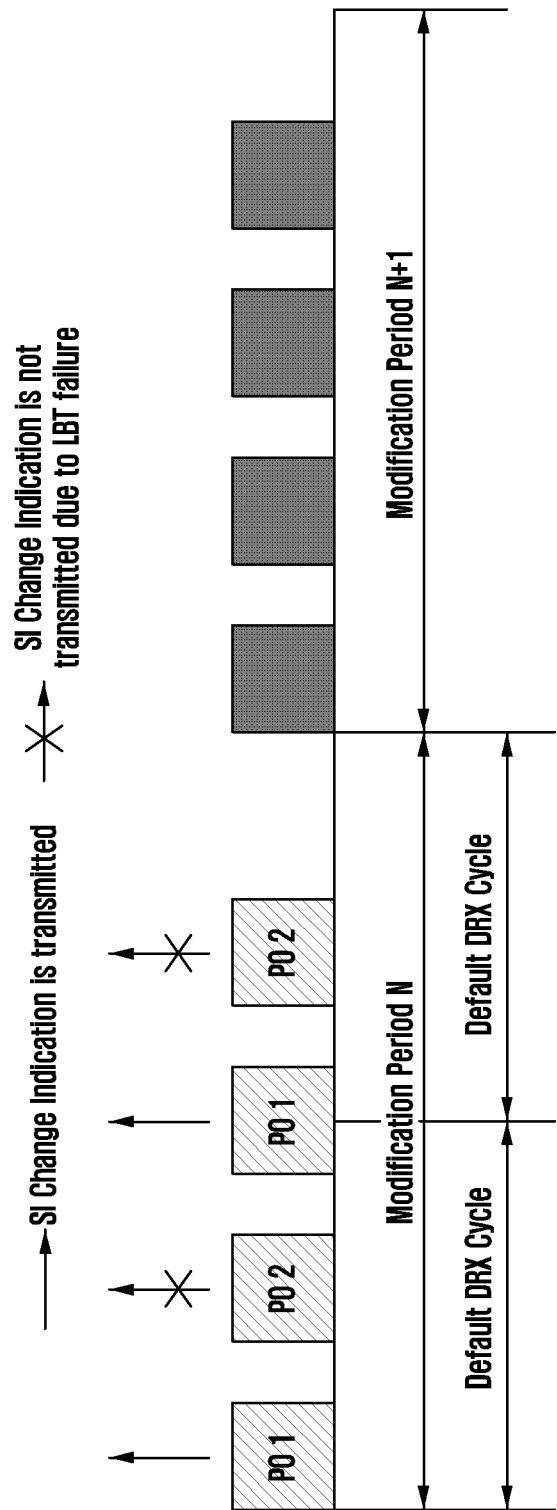
FIG. 1 shows an example where a system information (SI) change indication is not transmitted in a paging occasion (PO) because of listen before talk (LBT) failure according to related art.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

1. System Information (SI) Change Notification in New Radio Unlicensed (NR-U)

Method 1:

In one method of the disclosure, it is proposed that SI change indication can be transmitted by gNB in multiple modification periods.

Figure 2:
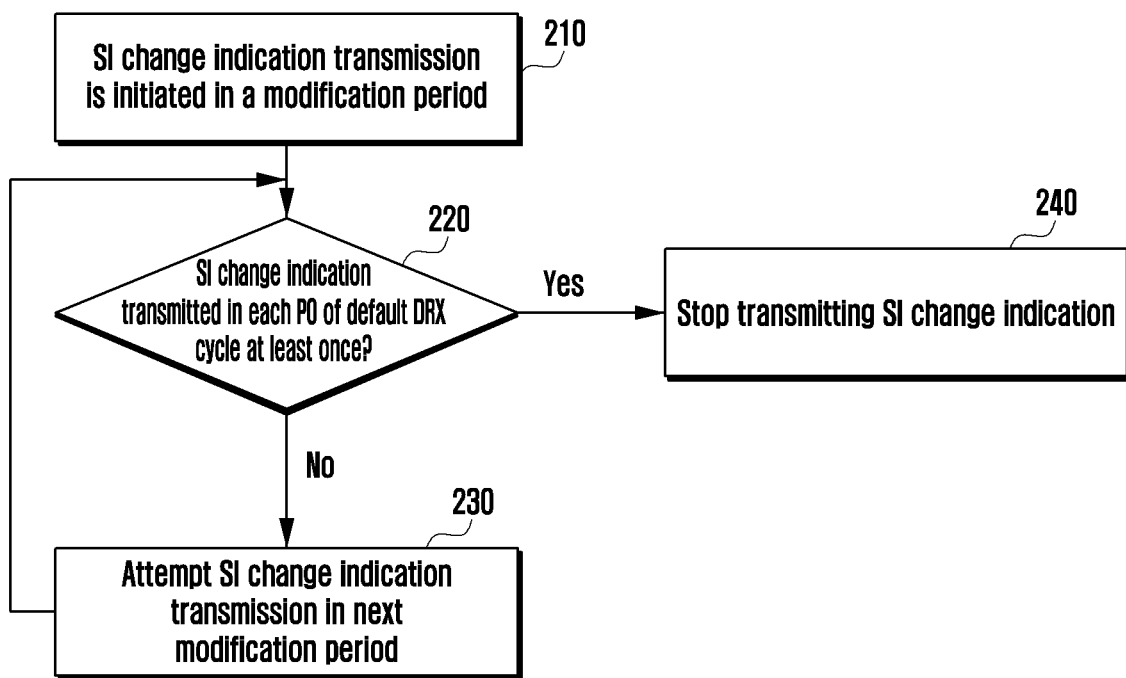
FIG. 2 illustrates a next generation node B (gNB) transmitting a SI change indication in one or more modification periods according to an embodiment of the disclosure.

FIG. 2 illustrates a gNB transmitting an SI change indication in one or more modification periods according to an embodiment of the disclosure.

Referring to FIG. 2, upon initiation of transmission of an SI change indication in a modification period, the gNB can continue transmitting SI change indication in subsequent modification periods until it has transmitted SI change indication in each paging occasion (PO) of a default discontinuous reception (DRX) cycle at least once. For example, upon initiation of transmission of SI change indication in a modification period N at operation 210, the gNB determines whether SI change indication is transmitted in each PO of default DRX cycle at least once at operation 220. If the gNB fails to transmit SI change indication in each PO of the default DRX cycle at least once by end of modification period N, the gNB attempts SI change indication transmission in next modification period, i.e. the gNB transmits SI change indication in modification period N+1 at operation 230. If the gNB has still not transmitted SI change indication in each PO of the default DRX cycle at least once by the end of modification period N+1, the gNB transmits SI change indication in modification period N+2 and so on. If the gNB has transmitted SI change indication in each PO of the default DRX cycle at least once, the gNB stops transmitting SI change indication at operation 240.

Figure 3:
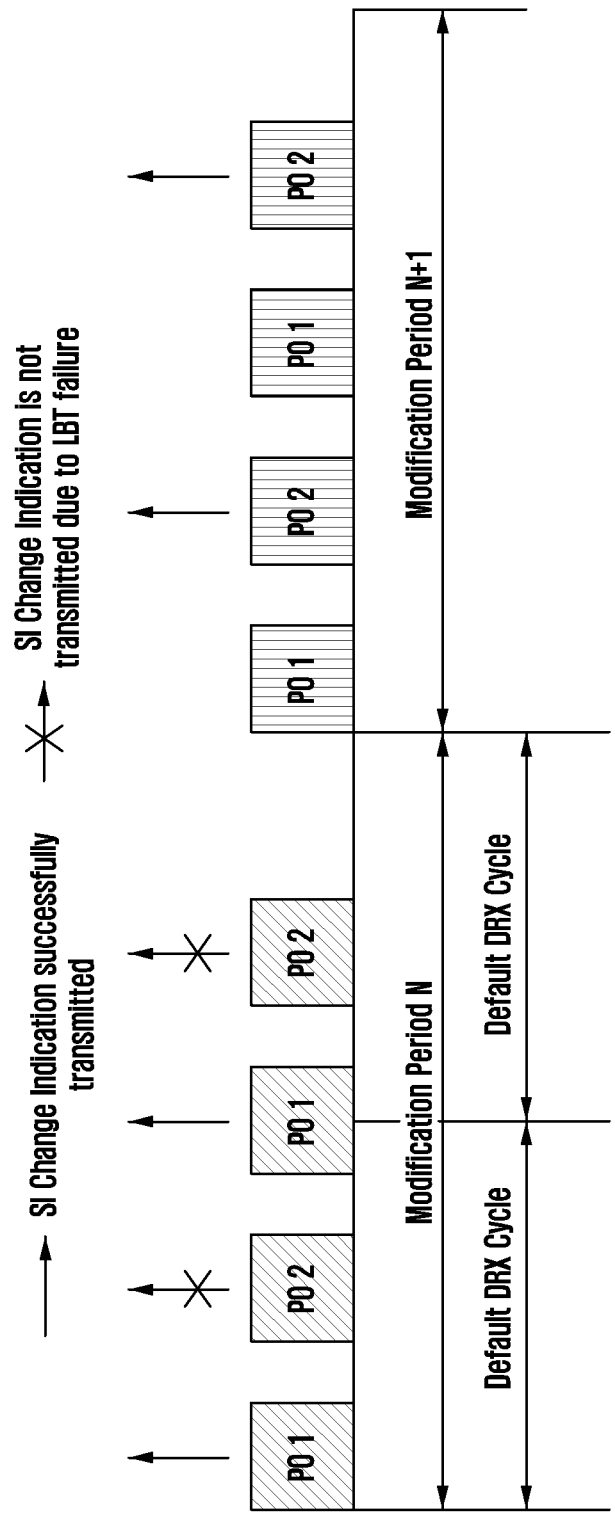
FIG. 3 shows an example where gNB initiates transmission of SI change indication in modification period N according to an embodiment of the disclosure.

FIG. 3 shows an example where gNB initiates transmission of SI change indication in modification period N according to an embodiment of the disclosure.

Referring to FIG. 3, a modification period N comprises of two default DRX cycles, where each default DRX cycle has two POs. The gNB should transmit SI change indication in each PO (i.e., PO 1 and PO 2) at least once. PO1 and PO2 occur two times in a modification period and the gNB can transmit SI change indication in each occurrence of PO1 and PO2 for reliable delivery. In the modification period, the gNB is able to transmit SI change indication in PO1 at least once but fails to transmit an SI change indication in PO2 because the channel is not available at occurrence of PO2. Thus, the gNB continues an SI change indication transmission in modification period N+1. In the modification period N+1, the gNB may attempt to transmit SI change indication only in PO2 or it can attempt to transmit SI change indication in PO1 and PO2, even if it has transmitted SI change indication in PO1 in modification period N. Referring to FIG. 3, the gNB has transmitted an SI change indication in PO2 in the modification period N+1. By the end of modification period N+1, the gNB has transmitted an SI change indication in each PO (i.e. PO1 and PO2) at least once since it started SI change indication transmission, so the gNB does not need to continue SI change indication transmission in modification period N+2.

Figure 4:
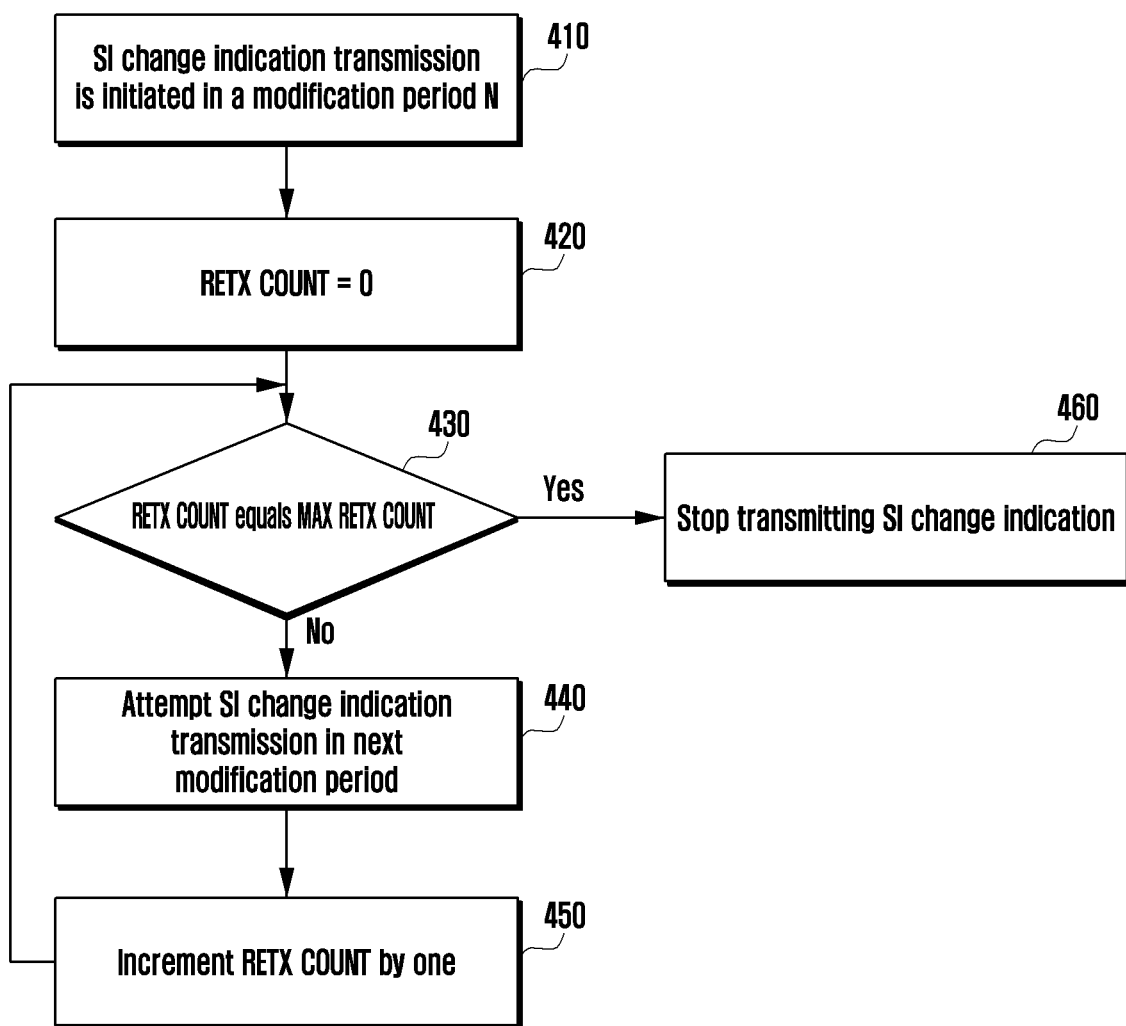
FIG. 4 illustrates a gNB transmitting SI change indication in one or more modification periods together with RETX COUNT according to an embodiment of the disclosure.

FIG. 4 illustrates a gNB transmitting SI change indication in one or more modification periods together with RETX COUNT according to an embodiment of the disclosure.

Referring to FIG. 4, the gNB transmits an SI change indication in multiple modification periods irrespective of whether the gNB has transmitted in each PO of the default DRX cycle at least once or not.

In an existing system, the SI change indication is a one bit indication included in downlink control information (DCI) of physical downlink control channel (PDCCH) addressed to paging radio network temporary identifier (P-RNTI). A short message including an SI change indication is transmitted in DCI of PDCCH addressed to P-RNTI. The UE monitors for PDCCH addressed to P-RNTI in PO. An SI change indication bit set to one notifies the UE about an SI change notification. The UE receives the updated SI in the next modification period. Even if the UE receives the SI change indication multiple times during a modification period, there is no issue as UE acquires an updated SI from the next modification period. However, because SI change indications may be transmitted in multiple modification periods, UEs which have received an SI change indication in the modification period N may also receive the SI change in modification period N+1. These UEs will first read a master information block (MIB) and an SI block (SIB), such as an SIB1, in modification period N+1 and then again unnecessarily in modification period N+2. To overcome this, additional information can be included together with the SI change indication. This additional information indicates that the SI change indication in this modification period is a repetition of the SI change indication transmitted in previous modification period.

In one embodiment of the disclosure, this additional information may be a retransmission counter and is defined as a new parameter RETX COUNT. In the first modification period in which an SI change indication is transmitted, RETX COUNT is set to 0 or it can be skipped. In the second modification period in which SI change indication is retransmitted, the RETX COUNT is set to 1. In the third modification period in which SI change indication is retransmitted, the RETX COUNT is set to 2 and so on . . . .

Referring to FIG. 4, upon initiation of transmission of an SI change indication in a modification period N at operation 410, the gNB sets the RETX COUNT to zero at operation 420. The gNB determines whether RETX COUNT equals to a maximum (i.e., MAX RETX COUNT) at operation 430. If the RETX COUNT is less than the MAX RETX COUNT, the gNB attempts an SI change indication transmission in next modification period, i.e., the gNB transmits SI change indication in modification period N+1 at operation 440. After transmitting an SI change indication, gNB increments RETX COUNT by one at operation 450. If the RETX COUNT equals the MAX RETX COUNT, the gNB stops transmitting the SI change indication at operation 460.

It is to be noted that the SI change indication can be transmitted multiple times within a modification period and the RETX COUNT remains same for all these transmissions.

Figure 5:
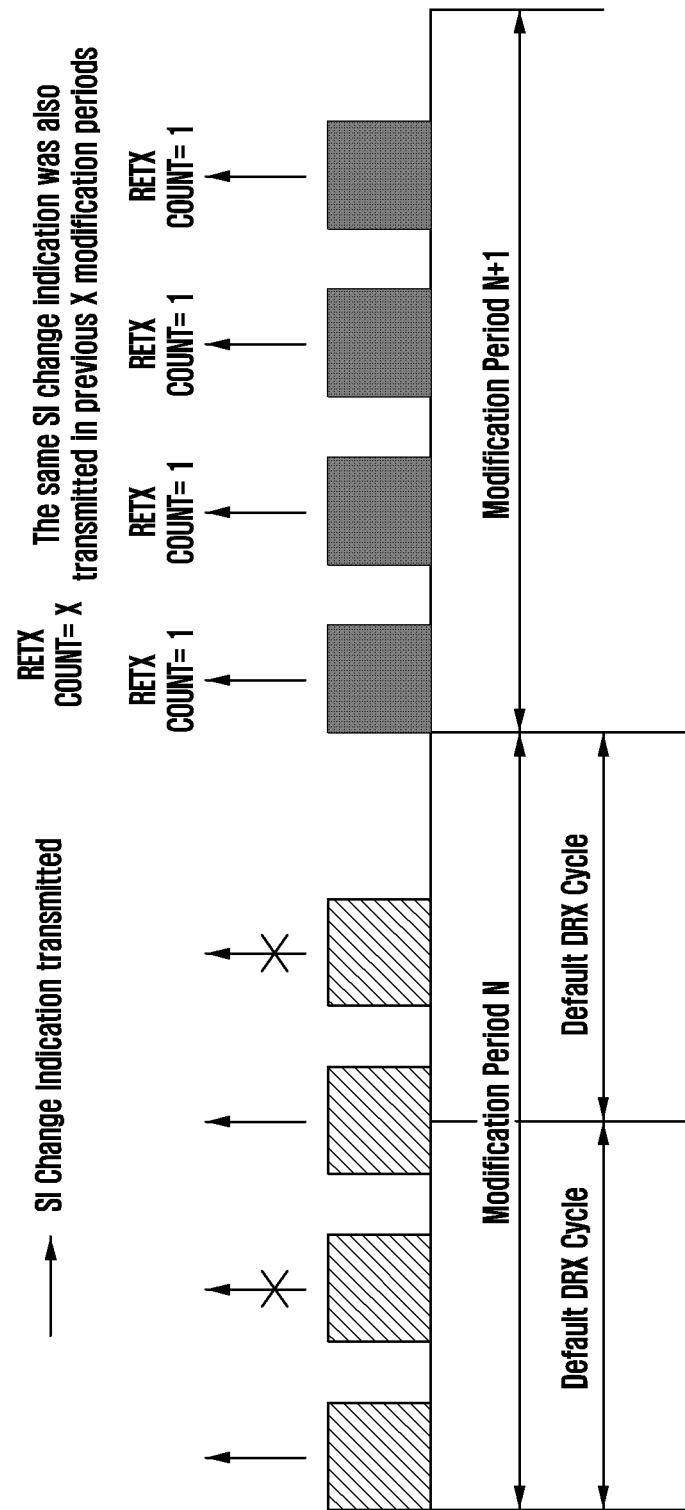
FIG. 5 is an example illustration of transmitting an SI change indication together with a RETX COUNT according to an embodiment of the disclosure.

FIG. 5 is an example illustration of transmitting an SI change indication together with a RETX COUNT according to an embodiment of the disclosure.

Referring to FIG. 5, in the first modification period N, the gNB transmits an SI change indication in PO1 of each default DRX cycle but fails to transmit an SI change indication in PO2. Thus, the gNB continues an SI change indication transmission with the RETX COUNT set to 1 in the next modification period N+1.

Figure 6:
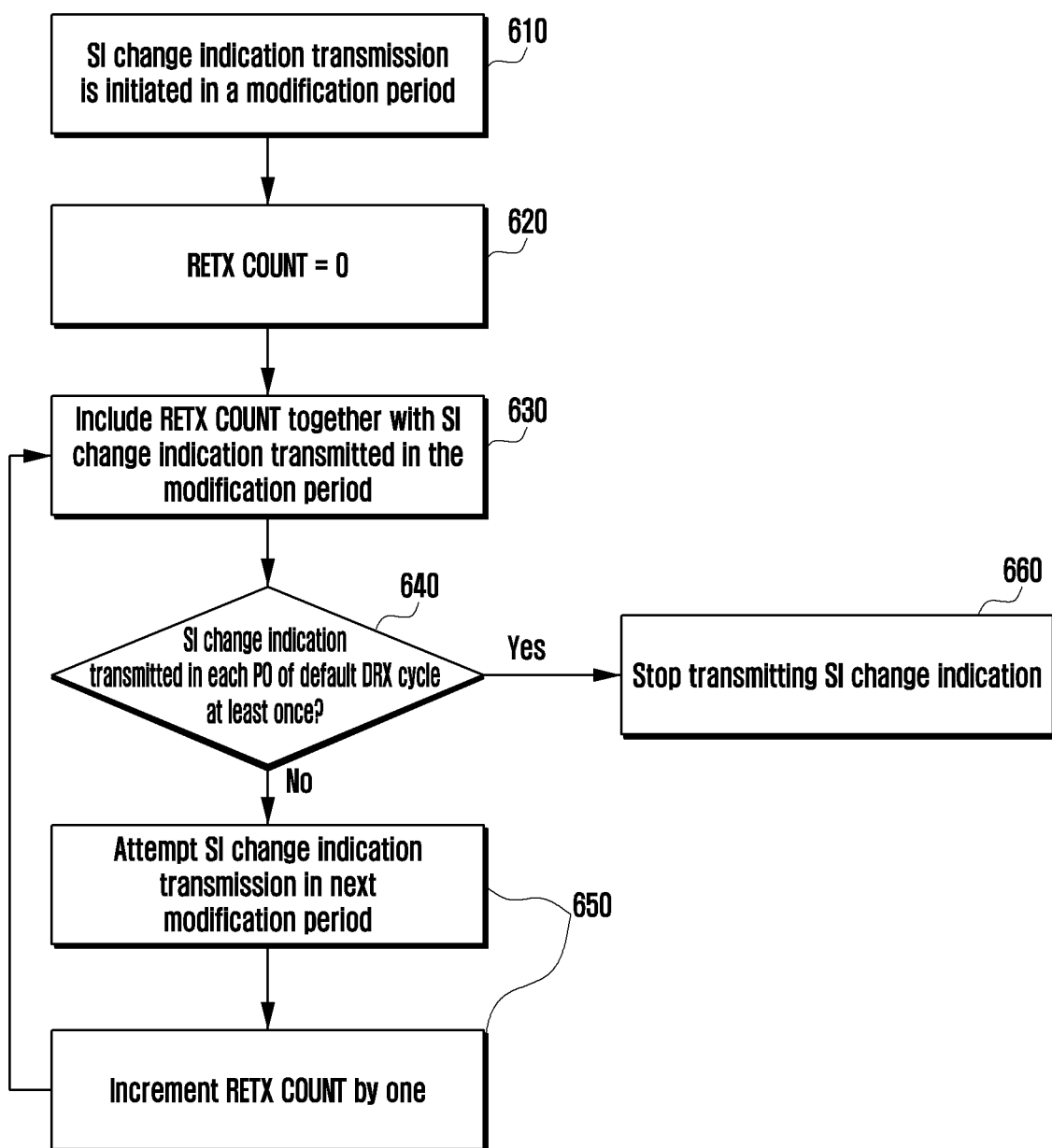
FIG. 6 illustrates a flowchart for transmitting SI change indication in one or more modification periods together with a RETX COUNT according to an embodiment of the disclosure.

FIG. 6 a flowchart for transmitting an SI change indication in one or more modification periods together with a RETX COUNT according to an embodiment of the disclosure.

Referring to FIG. 6, a gNB initiates transmission of an SI change indication in a modification period at operation 610. The RETX COUNT is set to zero at operation 620. The gNB includes a RETX COUNT together with the SI change indication transmitted in the modification period at operation 630. The gNB determines whether the SI change indication is transmitted in each PO of default DRX cycle at least once at operation 640. By the end of the modification period, if the SI change indication is not transmitted in each PO of the default DRX cycle at least once, the gNB increments the RETX COUNT by one and attempts SI change indication transmission in the next modification period, i.e., the gNB transmits the SI change indication in the next modification period at operation 650. The RETX COUNT is transmitted together with SI change indication. If the SI change indication has been transmitted in each PO of default DRX cycle at least once, the gNB stops transmitting SI change indication at operation 660.

Figure 7:
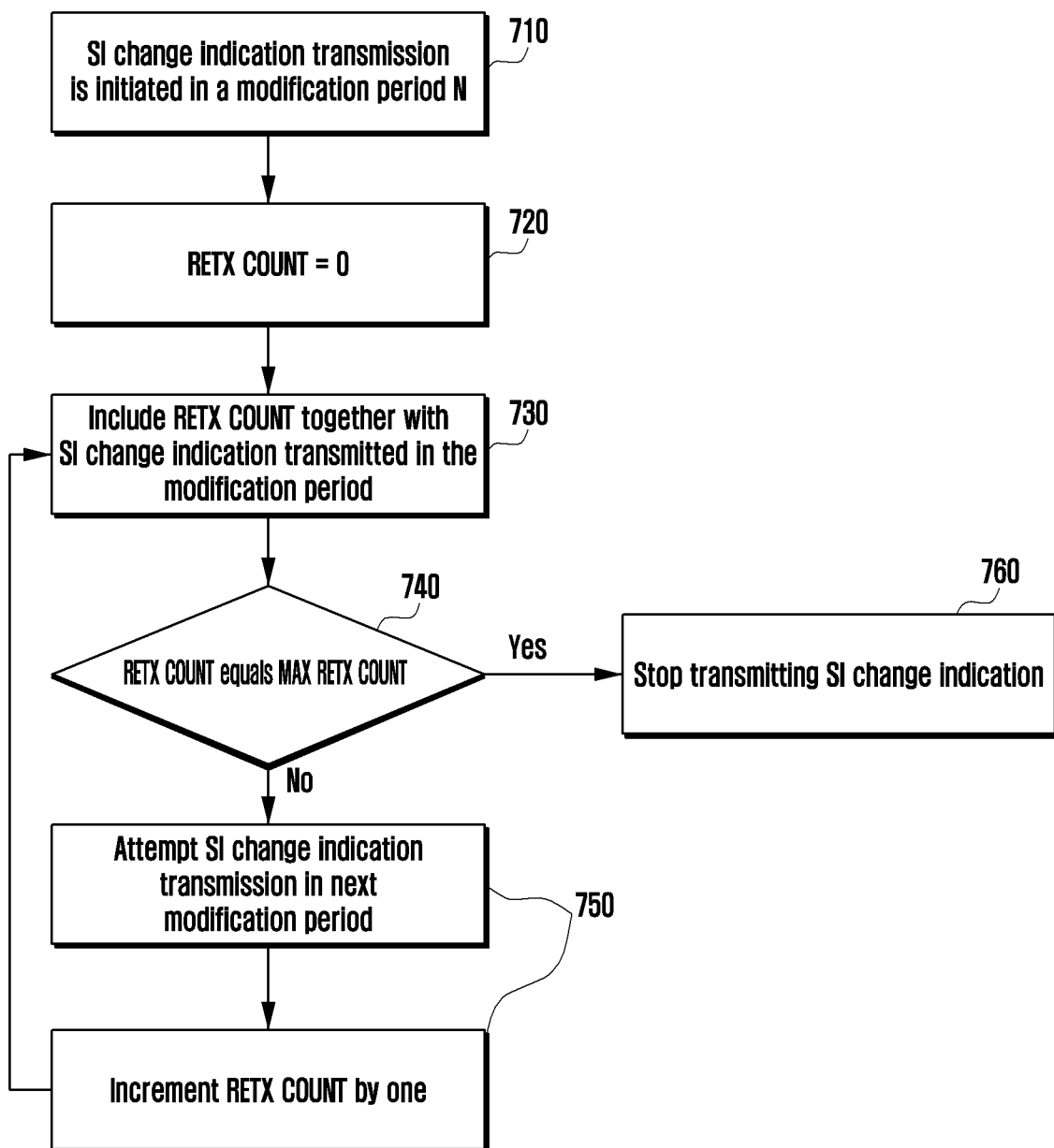
FIG. 7 illustrates a flowchart for transmitting an SI change indication in multiple modification periods together with a RETX COUNT according to an embodiment of the disclosure.

FIG. 7 illustrates a flowchart for transmitting an SI change indication in multiple modification periods together with a RETX COUNT according to an embodiment of the disclosure.

Referring to FIG. 7, the gNB initiates transmission of SI change indication in a modification period at operation 710. The RETX COUNT is set to zero at operation 720. The gNB includes RETX COUNT together with SI change indication transmitted in the modification period at operation 730. The gNB determines whether RETX COUNT equals the MAX RETX COUNT at operation 740. If the RETX COUNT is less than MAX RETX COUNT, the gNB attempts an SI change indication transmission in next modification period, i.e., the gNB transmits the SI change indication in the next modification period, and increments the RETX COUNT after every modification period at operation 750. The RETX COUNT is transmitted together with the SI change indication. If the RETX COUNT is equal to the MAX RETX COUNT, the gNB stops transmitting the SI change indication at operation 760.

Referring to FIGS. 6 and 7, instead of RETX COUNT, a transmission (TX) COUNT can be used. The TX COUNT can be set to zero for the modification period in which the SI change indication is initiated and then incremented by one for each subsequent modification period in which SI change indication transmission is attempted.

The above embodiments explained in FIGS. 2 to 7, can also be used to deliver a public warning system (PWS) notification.

Embodiment 1

Figure 8:
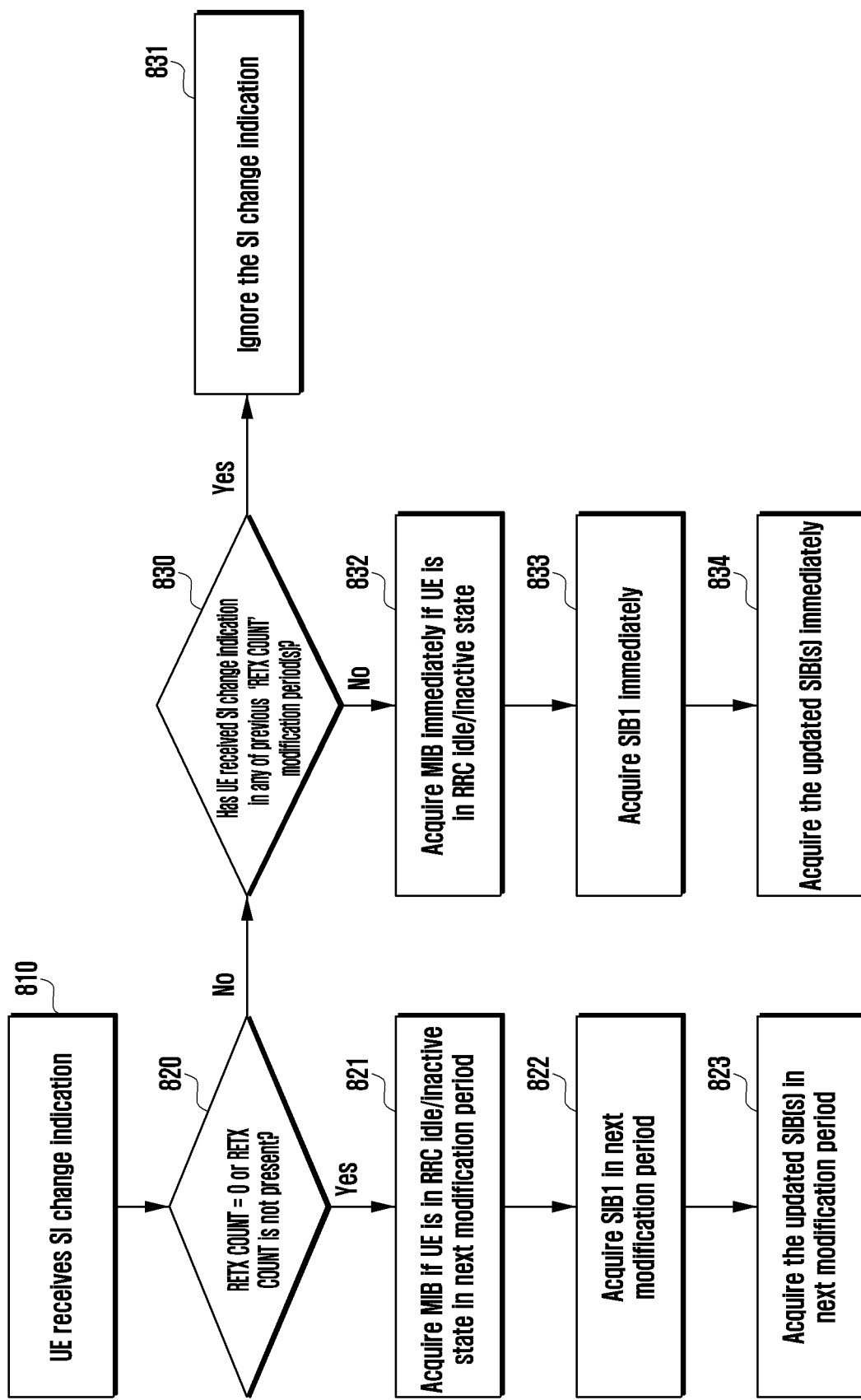
FIG. 8 illustrates a flow chart for receiving an SI change indication together with a RETX COUNT and updating an SI according to an embodiment of the disclosure.

FIG. 8 illustrates a flowchart for receiving an SI change indication together with a RETX COUNT and updating an SI according to an embodiment of the disclosure.

Referring to FIG. 8, a UE receives the SI change indication in a modification period at operation 810. At operation 820, the UE determines whether the RETX COUNT is zero or is not received together with an SI change indication. If the RETX COUNT is zero or is not received together with SI change indication, the UE acquires the updated SI in next modification period. At operation 821, the UE acquires an MIB if the UE is in a radio resource control (RRC) idle/inactive state in next modification period. The UE acquires SIB1 in the next modification period at operation 822, or reads SIB1. The UE reads the value tags in SIB1 and determines which SIBs are updated. The UE acquires the updated SIBs in the next modification period at operation 823.

At operation 830, if the RETX COUNT is equal to X (where X>0), i.e. the RETX COUNT is present and not zero, the UE determines whether UE has received SI change indication in any of previous X modification period(s). If UE has received an SI change indication in any of previous X modification periods, the UE ignores this SI change indication at operation 831. If the UE has not received an SI change indication in any previous X modification period(s), the UE acquires the updated SI. That is, the UE acquires the MIB immediately if in the idle/inactive state at operation 832. The UE acquires SIB1 at operation 833 or reads SIB1. The UE reads the value tags in SIB1 and determines which SIBs are updated. The UE acquires the updated SIBs at operation 834.

Embodiment 2

Figure 9:
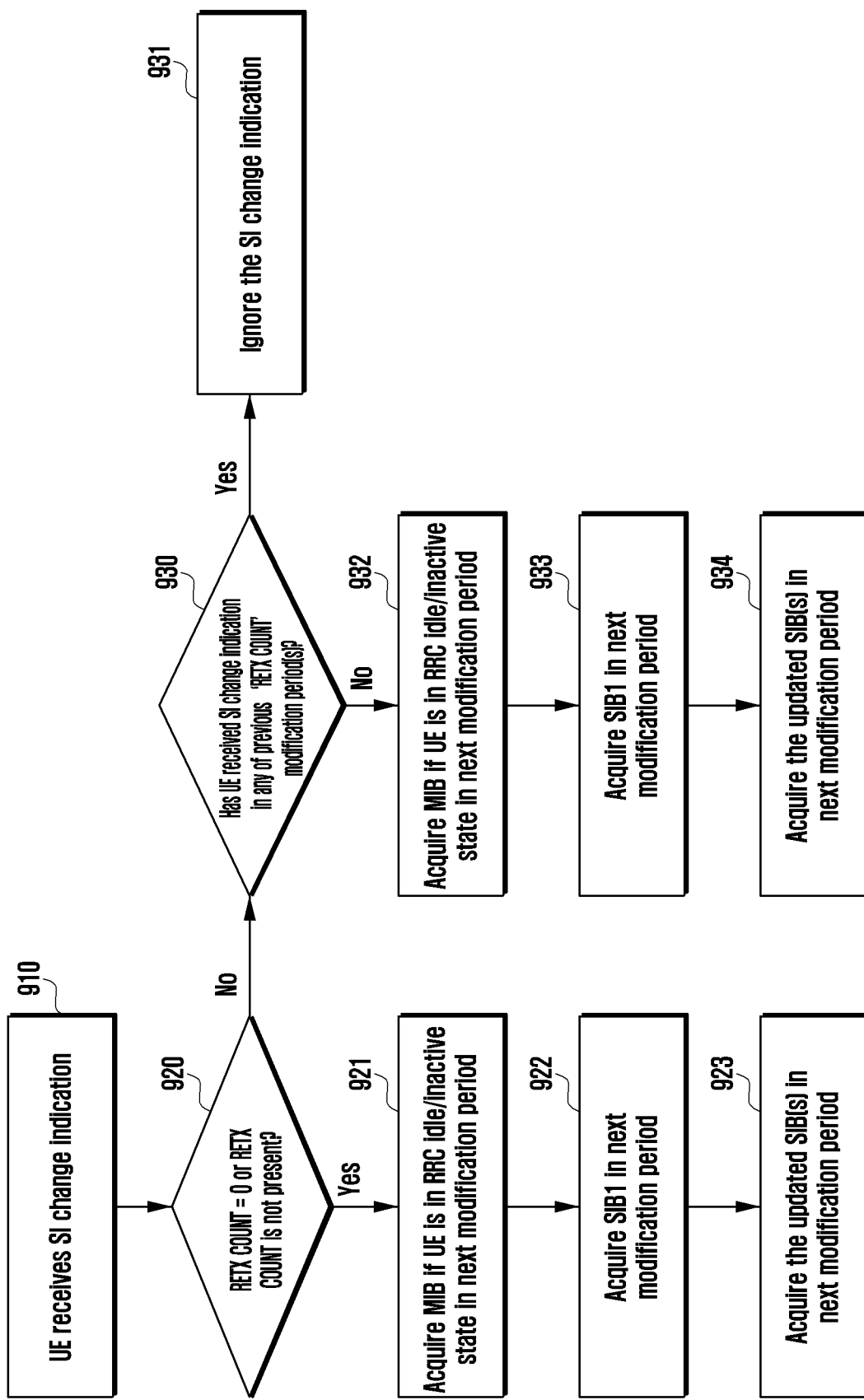
FIG. 9 illustrates a flow chart for receiving an SI change indication together with a RETX COUNT and updating an SI according to an embodiment of the disclosure.

FIG. 9 illustrates a flowchart for receiving an SI change indication together with a RETX COUNT and updating an SI according to an embodiment of the disclosure.

Referring to FIG. 9, at operation 910, the UE receives SI change indication in a modification period. At operation 920, the UE determines whether the RETX COUNT is zero or is not received together with SI change indication. If the RETX COUNT is zero or is not received together with SI change indication, the UE acquires the updated SIs in the next modification period. The UE acquires MIB if in the idle/inactive state in the next modification period at operation 921. The UE acquires SIB1 in the next modification period at operation 922, or reads SIB1. The UE reads the value tags in SIB1 and determines which SIBs are updated. The UE acquires the updated SIBs in the next modification period at operation 923.

At operation 930, if the RETX COUNT is equal to X (where X>0), i.e. the RETX COUNT is present and not zero, the UE determines whether the UE has received SI change indication in any of previous X modification period(s). If the UE has received the SI change indication in any of previous X modification period(s), the UE ignores this SI change indication at operation 931. If the UE has not received the SI change indication in any of previous X modification period(s), the UE acquires the updated SI in next modification period. The UE acquires the MIB if in idle/inactive state in the next modification period at operation 932. The UE reads the MIB if in an idle/inactive state. The UE acquires SIB1 in next modification period at operation 933, or reads SIB1. The UE reads the value tags in SIB1 and determines which SIBs are updated. The UE acquires the updated SIBs in next modification period at operation 934.

Embodiment 3

In an embodiment, the UE operation for receiving SI change indication together with RETX COUNT and updating SI begins with the UE receiving SI change indication in a modification period.

If the RETX COUNT is zero or is not received together with SI change indication, the UE acquires the updated SI(s) from the modification period, which is determined based on modification period info indicated by gNB together with SI change indication. If the modification period info is set to 0, the UE acquires updated SI(s) immediately. If the SI change indication is received in modification period N and the modification period info is set to 1, the UE acquires the updated SI(s) from modification period N+1. If the SI change indication is received in the modification period N and the modification period info is set to 2, the UE acquires the updated SI(s) from modification period N+2. If the SI change indication is received in the modification period N and the modification period info is set to i, the UE acquires the updated SI(s) from modification period N+i.

If the RETX COUNT is equal to X (where X>0), i.e. RETX COUNT is not zero, the UE determines whether the SI change indication was received in any of previous X modification period(s). If the UE has received the SI change indication in any of previous X modification period(s), the UE ignores this SI change indication. If the UE has not received the SI change indication in any of previous X modification period(s), the UE acquires the updated SI(s) from the modification period, which is determined based on modification period info indicated by gNB together with SI change indication. If the modification period info is set to 0, the UE acquires updated SI(s) immediately. If the SI change indication is received in the modification period N and the modification period information is set to 1, the UE acquires the updated SI(s) from modification period N+1. If the SI change indication is received in the modification period N and the modification period info is set to 2, the UE acquires the updated SI(s) from the modification period N+2. If the SI change indication is received in the modification period N and the modification period info is set to i, the UE acquires the updated SI(s) from the modification period N+i.

Embodiment 4

In an embodiment, the UE operation for receiving SI change indication together with RETX COUNT and updating SI begins with the UE receiving an SI change indication in a modification period.

If the RETX COUNT is zero or is not received together with SI change indication, the UE determines whether the SI change indication is received in the modification period N. If the SI change indication is received in the modification period N, the UE acquires the updated SIB(s) from modification period N+K, where K=MAX_SI_CHANGE_TX. The MAX_SI_CHANGE_TX is the maximum number of modification periods in which the SI change indication is transmitted. The value of MAX_SI_CHANGE_TX can be pre-defined or signaled by gNB in the SI. From the modification period N+K, the UE reads the MIB if in an idle/inactive state. The UE reads SIB1, reads the value tag(s) in SIB1, and determines which SIB(s) are updated. The UE then acquires the updated SIB(s).

If the RETX COUNT is equal to X (where X>0), i.e., the RETX COUNT is not zero, the UE determines whether the UE has received the SI change indication in any of previous X modification period(s). If the UE has received the SI change indication in any of the previous X modification period(s), the UE ignores this SI change indication. If the UE has not received the SI change indication in any of the previous X modification period(s) and the SI change indication is received in the modification period N, the UE acquires the updated SIB(s) from the modification period N+K, where K=MAX_SI_CHANGE_TX−RETX COUNT. The value of MAX_SI_CHANGE_TX is the maximum number of modification periods in which the SI change indication is transmitted. The value of MAX_SI_CHANGE_TX can be pre-defined or signaled by gNB in system information. From the modification period N+K, the UE reads the MIB if in an idle/inactive state. The UE reads SIB1, reads the value tag(s) in SIB1, and determines which SIB(s) are updated. The UE then acquires the updated SIB(s).

Embodiment 5

In an embodiment, the UE operation for receiving SI change indication together with Modification Period Info and updating SI begins by the UE receiving SI change indication together with Modification Period Info in a modification period.

The previous X modification period(s) are identified (i.e., X=(MAX_SI_CHANGE_TX−Modification Period Info). The value MAX_SI_CHANGE_TX is the maximum number of modification periods in which SI change indication is transmitted. The value of MAX_SI_CHANGE_TX can be pre-defined or signaled by gNB in SI.

If the UE has received SI change indication in any of previous X modification period(s), the UE ignores this SI change indication.

If the UE has not received SI change indication in any of previous X modification period(s) and SI change indication is received in modification period N, the UE acquires the SI from modification period N+Modification Period Info. The UE reads the MIB if in an idle/inactive state, reads SIB1, reads the value tag(s) in SIB1, and determines which SIB(s) are updated. The UE then acquires the updated SIB(s).

Embodiment 6

In an embodiment, the UE operation for receiving a PWS notification together with RETX COUNT and updating SI is described. Initially, the UE receives PWS notification in a modification period.

If the RETX COUNT is zero or is not received together with the PWS notification, the UE acquires the updated SI immediately. The UE reads SIB1. If the UE is earthquake and tsunami warning system (ETWS) capable and si-SchedulingInfo in SIB1 includes scheduling information for SIB6, the UE acquires SIB6 immediately. If the UE is ETWS capable and si-SchedulingInfo in SIB1 includes scheduling information for SIB7, the UE acquires SIB7 immediately. If the UE is commercial mobile alert system (CMAS) capable and si-SchedulingInfo in SIB1 includes scheduling information for SIB8, the UE acquires SIB8 immediately.

If the RETX COUNT is equal to X (where X>0), i.e., the RETX COUNT is not zero, the UE determines whether the UE has received PWS notification in any of previous X modification period(s). If the UE has received PWS notification in any of previous X modification period(s), the UE ignores this PWS notification. If the UE has not received PWS notification in any of previous X modification period(s), the UE acquires the updated SI immediately. The UE reads SIB1. If the UE is ETWS capable and si-SchedulingInfo in SIB1 includes scheduling information for SIB6, the UE acquires SIB6 immediately. If the UE is ETWS capable and si-SchedulingInfo in SIB1 includes scheduling information for SIB7, the UE acquires SIB7 immediately. If the UE is CMAS capable and si-SchedulingInfo in SIB1 includes scheduling information for SIB8, the UE acquires SIB8 immediately.

In the embodiment explain above, the RETX COUNT can be separate for SI change indication and PWS notification.
Method 2:

In this method of the disclosure, it is proposed to specify an SIB1 acquisition period T. In an embodiment, T can be in multiple of SI modification period. In this example, T can be pre-defined or signaled in SI (e.g. SIB1). The SIB1 acquisition period T starts in radio frame(s) which satisfies SFN mod T=0.

It is proposed that, if the UE has not received SI change indication and has not read SIB1 in an SIB1 acquisition period, the UE acquires SIB1 in the next SIB1 acquisition period. The UE may also read the MIB if in an idle/inactive state. The advantage of this approach is that if the gNB is not able to transmit an SI change indication in all POs of the default DRX cycle even after attempting an SI change indication transmission in several modification periods, the UE can autonomously read SIB1 and know about the updated SI based on value tags in SIB1.

Figure 10:
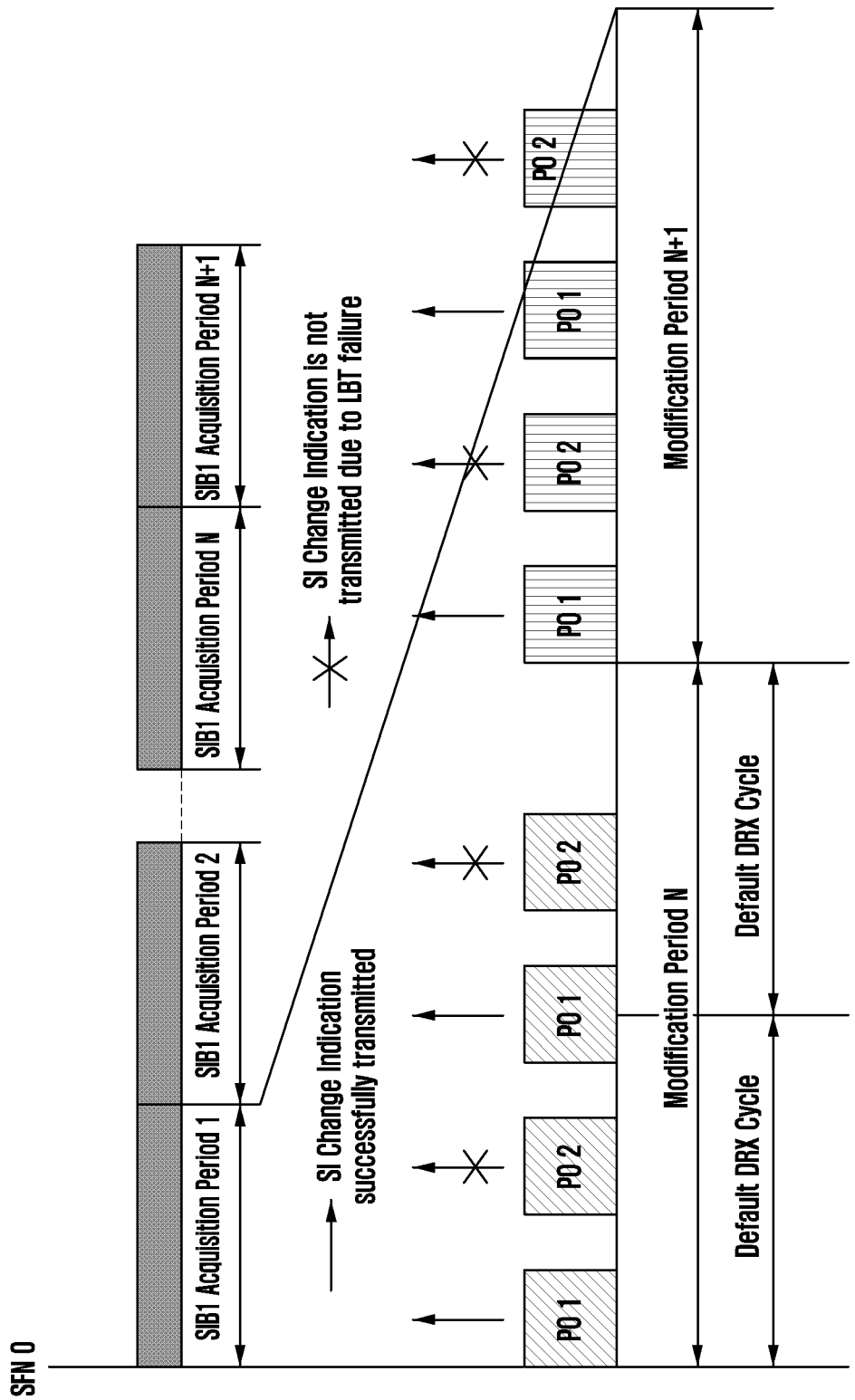
FIG. 10 shows an example where a gNB fails to transmit an SI change indication in PO2 for a default discontinuous reception (DRX) cycle even after attempting transmission in multiple modification periods according to an embodiment of the disclosure.

FIG. 10 shows an example where a gNB fails to transmit an SI change indication in PO2 for a default DRX cycle even after attempting transmission in multiple modification periods according to an embodiment of the disclosure.

Referring to FIG. 10, UE(s) monitoring PO2 will autonomously read SIB1 in an SIB1 acquisition period 2, as SI change indication is not received during SIB1 acquisition period 1 and the UE has not read SIB1 during the SIB1 acquisition period 1.

In an alternate embodiment, it is proposed that, if the UE has not received a short message (indicating SI change indication or PWS notification) and has not read SIB1 in an SIB1 acquisition period, the UE acquires SIB1 in the next SIB1 acquisition period. The UE may also read the MIB if in an idle/inactive state.
Method 3:

In this method of the disclosure, it is proposed to define a common region for transmitting and receiving an SI change indication and/or PWS notification.

Figure 11:
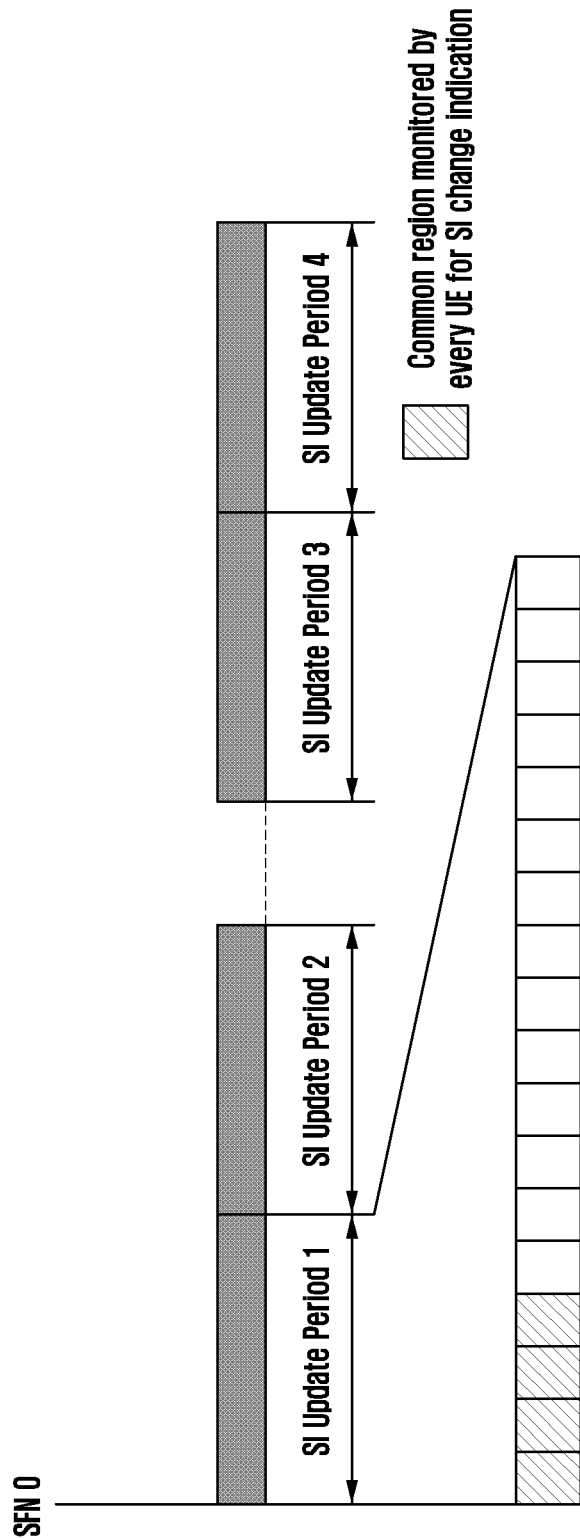
FIG. 11 shows an example of a common region according to an embodiment of the disclosure.

FIG. 11 shows an example of a common region according to an embodiment of the disclosure.

Referring to FIG. 11, a common region can be present periodically (e.g. every SI update period where SI update period is signaled in SI). Alternately, the common region can be defined in every modification period. This common region is monitored by each UE in a cell irrespective of its PO. The advantage of this approach is that the SI change indication and/or PWS notification is not required to be transmitted in each PO of the default DRX cycle. This reduces the number of required transmissions of the SI change indication and/or PWS notification and minimizes any impact due to listen before talk (LBT) on an unlicensed carrier.

The time and frequency location of this common region can be signaled in SI. In an embodiment, the common region is a window comprising N slots at the beginning of every SI update period. In this example, N is signaled in the SI. The slot length is determined based on subcarrier spacing (SCS) of a bandwidth part (BWP) in which an SI change indication and/or PWS notification is transmitted or received. The value of N can also be signaled in units of milliseconds instead of slots. In an embodiment, the UE monitors a window comprising of N slots at the beginning of every SI update period for receiving the SI change indication and/or PWS notification.

Figure 12:
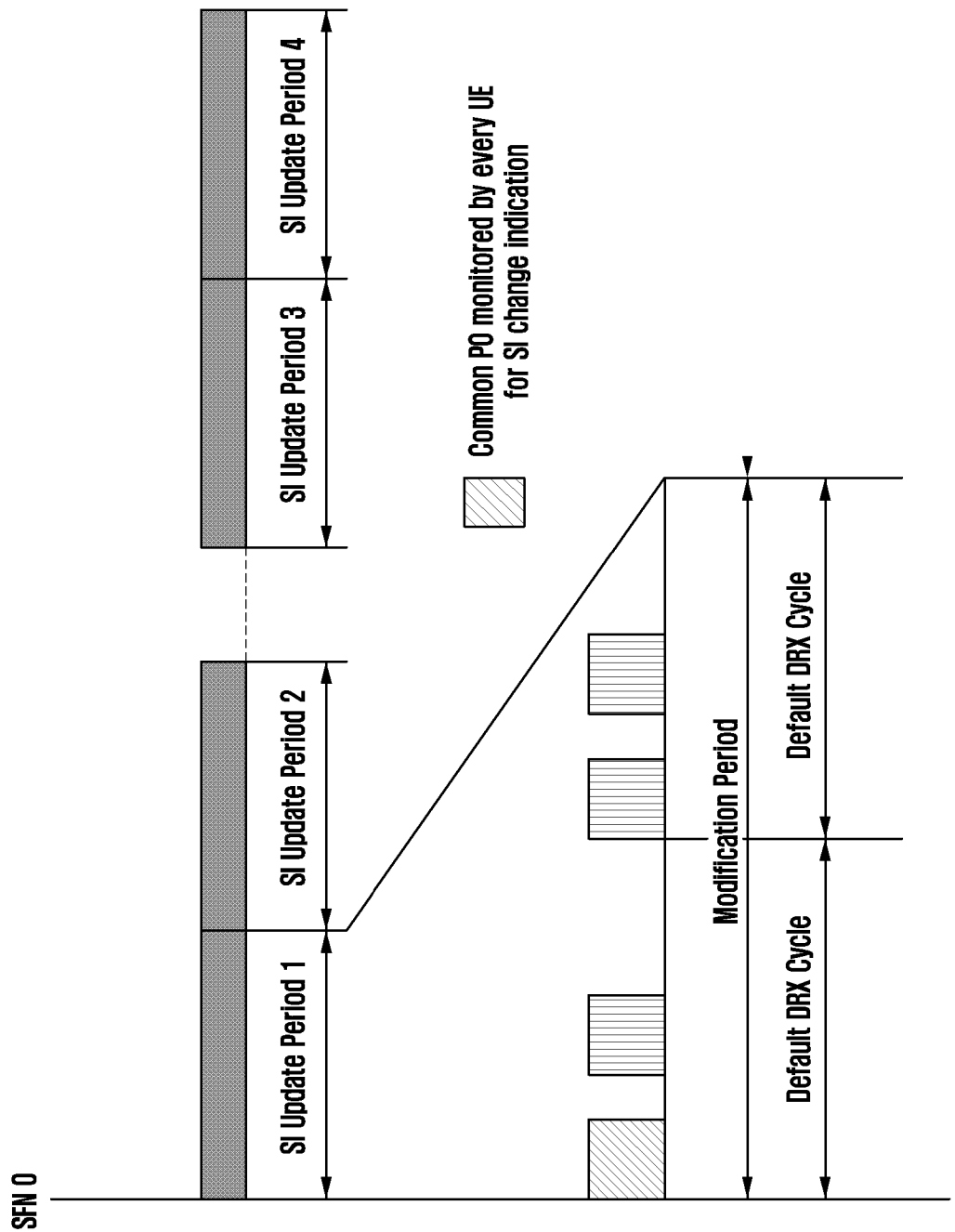
FIG. 12 shows another example of a common region according to an embodiment of the disclosure.

FIG. 12 shows another example of a common region according to an embodiment of the disclosure.

Referring to FIG. 12, a common region can be the first PO corresponding to the first paging frame (PF) in a first default DRX cycle of a modification period. Each modification period includes multiple default DRX cycles. Each default DRX cycle consists of multiple PFs and each PF has one or more POs.

In another embodiment of the disclosure, a common region can be the first PO corresponding to the first PF in each default DRX cycle of a modification period. Each modification period includes multiple default DRX cycles. Each default DRX cycle consists of multiple PFs and each PF has one or more POs.

In another embodiment of the disclosure, a common region can be the $i^{th}$ PO corresponding to the first PF of default DRX cycle of modification period. The value of i is signaled by a gNB in the SI. Each modification period includes multiple default DRX cycles. Each default DRX cycle consists of multiple PFs and each PF has one or more POs.

In another embodiment of the disclosure, a common region can be the $i^{th}$ PO corresponding to the first PF of each default DRX cycle of modification period. The value of i is signaled by gNB in SI. Each modification period includes multiple default DRX cycles. Each default DRX cycle consists of multiple PFs and each PF has one or more POs.

In this method of the disclosure, for receiving an SI change indication and/or PWS notification, the UE monitors the common region as specified above. For receiving the paging message, the UE monitors its PO. This is unlike the current system where a UE monitors its PO for receiving both SI change indication and/or PWS notification and paging message.

2. Method of Configuring Number of PFs (N) in DRX Cycle

In the 5G wireless communication system (also referred as next generation radio or NR), PDCCH is used to schedule downlink (DL) transmissions on physical DL shared channel (PDSCH) and uplink (UL) transmissions on physical UL shared channel (PUSCH), where the DCI on PDCCH includes: downlink assignments containing at least modulation and coding format, resource allocation, and hybrid-automatic repeat request (ARQ) information related to DL shared channel (DL-SCH); UL scheduling grants containing at least modulation and coding format, resource allocation, and hybrid-ARQ information related to UL shared channel (UL-SCH). In addition to scheduling, PDCCH can be used to for: activation and deactivation of configured PUSCH transmission with configured grant; activation and deactivation of PDSCH semi-persistent transmission; notifying one or more UEs of the slot format; notifying one or more UEs of the physical resource block(s) (PRB(s)) and orthogonal frequency division multiplexing (OFDM) symbol(s) where the UE may assume no transmission is intended for the UE; transmission of transmission power control (TPC) commands for PUCCH and PUSCH; transmission of one or more TPC commands for sounding reference signal (SRS) transmissions by one or more UEs; switching a UE's active bandwidth part; initiating a random access procedure. A UE monitors a set of PDCCH candidates in the configured monitoring occasions in one or more configured control resource sets (CORESETs) according to the corresponding search space configurations. A CORESET consists of a set of PRBs with time duration of 1 to 3 OFDM symbols. The resource units resource element groups (REGs) and control channel elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each REG carrying PDCCH carries its own demodulation reference signal (DMRS). Quadrature phase shift keying (QPSK) modulation is used for PDCCH.

In NR, a list of search space configurations are signaled by gNB for each configured BWP wherein each search configuration is uniquely identified by an identifier. Identifier of search space configuration to be used for specific purpose such as paging reception, SI reception, and random access response reception is explicitly signaled by gNB. In NR, search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below;

$$(y*(\text{number of slots in a radio frame})+x-\text{Monitoring-offset-PDCCH-slot}) \mod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the CORESET associated with the search space. Search space configuration includes the identifier of CORESET configuration associated with it. A list of CORESET configurations is signaled by gNB for each configured BWP wherein each CORESET configuration is uniquely identified by an identifier. Note that each radio frame is of 10 ms duration. Radio frame is identified by a radio frame number or system frame number (SFN). Each radio frame comprises of several slots wherein the number of slots in a radio frame and duration of slots depends on SCS. The number of slots in a radio frame and duration of slots depend on radio frame for each supported SCS is pre-defined in NR.

In the 5G (also referred as NR or New Radio) wireless communication system, a paging message is transmitted to the page UE, which is attached to the wireless communication network but in an idle/inactive mode. In the idle/inactive mode, the UE wake ups at regular intervals (i.e., at every paging DRX cycle) for short periods to receive the paging message and other broadcast information. A network may configure several POs in a DRX cycle. In a PO, a paging message is transmitted using PDSCH. The PDCCH is addressed to P-RNTI if there is a paging message in PDSCH. The P-RNTI is common for all UEs. So UE identity (i.e. system architecture evolution (SAE)-temporary mobile subscriber identity (S-TMSI)) is included in paging message to indicate a paging message for a specific UE. The paging message may include multiple UE identities to page multiple UEs. The paging message is broadcasted (i.e. PDCCH is masked with P-RNTI) over a data channel (i.e. PDSCH).

The UE monitors one PO for every DRX cycle. The UE determines its PO based on the UE identifier (ID). The UE first determines the PF and then determines the PO with respect to the determined PF. One PF is a radio frame (10 ms). The PF is the radio frame with a SFN which satisfies:

$$(\text{SFN}+\text{PF\_offset}) \mod T = (T \text{ div } N)*(\text{UE\_ID} \mod N)$$

The index i_s indicates the index of PO and is determined by:

$$i\_s = \text{floor}(\text{UE\_ID}/N) \mod Ns$$

The PDCCH monitoring occasions for paging are determined according to paging-SearchSpace. If paging- SearchSpace is set to zero, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF. If paging-SearchSpace is set to zero, PDCCH monitoring occasions for paging are same as the PDCCH monitoring occasions for SIB1.

If paging-SearchSpace is not set to zero, the UE monitors the $(i\_s+1)^{th}$ PO. The PDCCH monitoring occasions for paging are determined according to the search space configuration indicated by paging-SearchSpace. The PDCCH monitoring occasions for paging which are not overlapping with UL symbols are sequentially numbered from zero starting from the 1st PDCCH monitoring occasion for paging in the PF. When firstPDCCH-MonitoringOccasionOfPO is available (i.e. configured by the gNB), the $(i\_s+1)^{th}$ PO is a set of S consecutive PDCCH monitoring occasions for paging starting from the PDCCH monitoring occasion indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of S consecutive PDCCH monitoring occasions for paging starting from the $(i\_s*S)^{th}$ PDCCH monitoring occasion for paging, where S is the number of transmitted synchronization signal blocks (SSBs) determined according to ssb-PositionsInBurst in SIB1. The $K^{th}$ PDCCH monitoring occasion for paging in the PO corresponds to the $K^{th}$ transmitted SSB.

The following parameters are used for the calculation of PF and i_s above:

The parameter T corresponds to the DRX cycle of the UE. The value of T is determined by the shortest of the UE specific DRX value, if configured by RRC or upper layers, and a default paging cycle duration broadcast in SI. If UE specific DRX is not configured by RRC or by upper layers, the default value is applied.

The parameter N is the number of total PFs in T.

The parameter Ns is the number of paging occasions for a PF.

The parameter PF_offset is the offset used for PF determination.

The UE_ID is the 5G-S-TMSI mod 1024.

According to current design, the number of PFs N in the DRX cycle can be configurable. The gNB can select any value from {T, T/2, T/4, T/8 and T/16}. The issue is that when the gNB wants to transmit PDCCH for paging in the same occasion where the PDCCH for SIB1 (or remaining minimum system information (RMSI)) is also transmitted, selecting any value from {T, T/2, T/4, T/8 and T/16} would be in efficient. The PFs may not align with radio frames in which PDCCH for SIB1 (or RMSI) is transmitted. So an efficient way of selecting value of N is needed.

Figure 13:
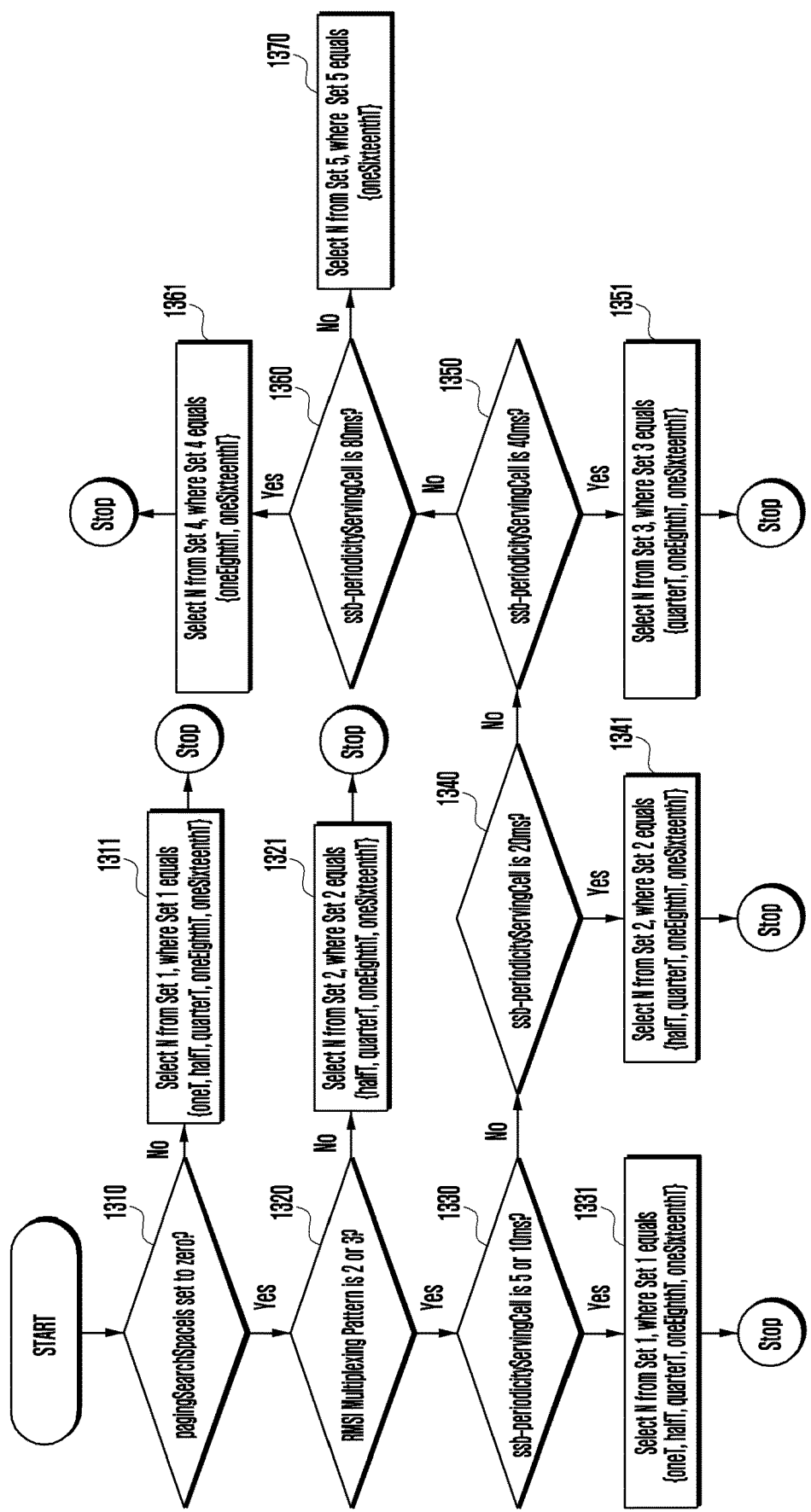
FIG. 13 illustrates gNB operation for selecting the number of total PFs in SI change indication in DRX cycle of the terminal according to an embodiment of the disclosure.

In this method of the disclosure, it is proposed that the gNB selects a value of N from one of following sets based on one or more of pagingSearchSpace configuration, RMSI multiplexing pattern (pattern 1, 2, or 3) and ssb-periodicityServingCell (i.e., periodicity of SSB transmitted in serving cell). The RMSI multiplexing pattern is also referred as synchronization signal (SS)/physical broadcast channel (PBCH) block (SSB) and CORESET multiplexing pattern. This parameter is signaled by the gNB in SIB1:

Set 1: {oneT, halfT, quarterT, oneEighthT, oneSixteenthT}
  Set 2: {halfT, quarterT, oneEighthT, oneSixteenthT}
  Set 3: {quarterT, oneEighthT, oneSixteenthT}
  Set 4: {oneEighthT, oneSixteenthT}
  Set 5: oneSixteenthT FIG. 13 illustrates gNB operation for selecting the number of total PFs in SI change indication in DRX cycle of the terminal according to an embodiment of the disclosure.

Referring to FIG. 13, gNB identifies pagingSearchSpace at operation 1310. If pagingSearchSpace is not set to zero, gNB selects N from Set 1 at operation 1311.

If pagingSearchSpace is set to zero, gNB identifies RMSI multiplexing pattern at operation 1320. RMSI may refer to SIB1. For SS/PBCH block and CORESET multiplexing pattern 1, SIB1 repetition transmission period is 20 ms. For SS/PBCH block and CORESET multiplexing pattern 2/3, SIB1 transmission repetition period is the same as the SSB period. A UE may monitor PDCCH based on SS/PBCH block and CORESET multiplexing pattern. For the SS/PBCH block and CORESET multiplexing pattern 1, a UE monitors PDCCH in the Type0-PDCCH common search space (CSS) set over two consecutive slots starting from slot $n_0$. For the SS/PBCH block and CORESET multiplexing patterns 2 and 3, a UE monitors PDCCH in the Type0-PDCCH CSS set over one slot with Type0-PDCCH CSS set periodicity equal to the periodicity of SS/PBCH block. If RMSI multiplexing pattern is 1, gNB selects N from Set 2 at operation 1321.

If RMSI multiplexing pattern is either 2 or 3: gNB identifies ssb-periodicityServingCell at operations 1330, 1340, 1350 and 1360. If ssb-periodicityServingCell is 5 or 10 ms, select N from Set 1 at operation 1331. If ssb-periodicityServingCell is 20 ms, select N from Set 2 at operation 1341. If ssb-periodicityServingCell is 40 ms, select N from Set 3 at operation 1351. If ssb-periodicityServingCell is 80 ms, select N from Set 4 at operation 1361. If ssb-periodicityServingCell of 160 ms, select N from Set 5 at operation 1370. The selected value of N is broadcasted by the gNB in a paging configuration in SIB1.

In an embodiment of the disclosure, if pagingSearchSpace is zero and RMSI multiplexing pattern is 1, gNB sets PF_offset to zero and signals the same in paging configuration. If pagingSearchSpace is zero and RMSI multiplexing pattern is 2 or 3, gNB sets PF_offset to 'X' where 'X' is the SFN of earliest radio frame in SFN cycle in which SSB is transmitted by gNB. In an embodiment of the disclosure, if pagingSearchSpace is zero and RMSI multiplexing pattern is 1, gNB sets Ns equals to 1, and signals the same in paging configuration. If pagingSearchSpace is zero and RMSI multiplexing pattern is 2 or 3 and ssb-periodicityServingCell is 5 ms, gNB sets Ns equals to 1 or 2, and signals the same in paging configuration. If pagingSearchSpace is zero and RMSI multiplexing pattern is 2 or 3 and ssb-periodicityServingCell is other than 5 ms, gNB sets Ns equals to 1 and signals the same in paging configuration. By selecting the parameter values as explained above, gNB can align the paging frame with radio frame where PDCCH is transmitted, and also align the PDCCH monitoring occasions for paging with PDCCH monitoring occasions of SIB1.

Figure 14:
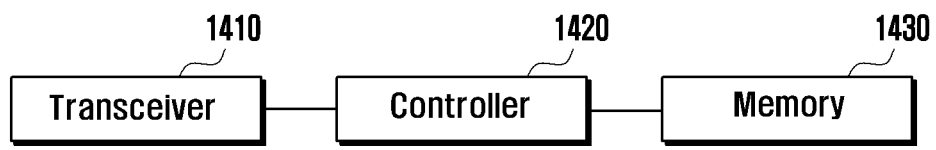
FIG. 14 is a block diagram of a base station according to an embodiment of the disclosure.

FIG. 14 is a block diagram of a base station according to an embodiment of the disclosure.

Referring to FIG. 14, a base station includes a transceiver 1410, a controller 1420 and a memory 1430. The controller 1420 may refer to a circuitry, an ASIC, an FPGA, or at least one processor. The transceiver 1410, the controller 1420 and the memory 1430 are configured to perform the operations of the gNB illustrated in the figures, e.g. FIGS. 1 to 7 and 10 to 13, or as otherwise described above. Although the transceiver 1410, the controller 1420 and the memory 1430 are shown as separate entities, they may be realized as a single entity and integrated onto a single chip. The transceiver 1410, the controller 1420 and the memory 1430 may also be electrically connected to or coupled with each other.

The transceiver 1410 may transmit and receive signals to and from other network entities, e.g., a terminal.

The controller 1420 may control the gNB to perform functions according to the embodiments described above. For example, the controller 1420 is configured to determine a number N of PFs in a DRX cycle based on information on paging search space (e.g. pagingSearchSpace). The controller 1420 is configured to transmit information on the number of PFs in SIB1 to a terminal via the transceiver 1410. The controller 1420 is configured to identify at least one PF based on the number of PFs and transmit at least one paging message in the at least one PF to the terminal via the transceiver 1410. The controller 1420 may be further configured to identify SSB and CORESET multiplexing pattern (e.g. RMSI multiplexing pattern) and periodicity of SSBs transmitted in a serving cell (e.g. ssb-periodicityServingCell).

In an embodiment, the operations of the base station may be implemented using the memory 1430 storing corresponding program codes. Specifically, the base station may be equipped with the memory 1430 to store program codes implementing desired operations. To perform the desired operations, the controller 1420 may read and execute the program codes stored in the memory 1430 by using a processor or a central processing unit (CPU).

Figure 15:
FIG. 15 is a block diagram of a terminal according to an embodiment of the disclosure.

FIG. 15 is a block diagram of a terminal according to an embodiment of the disclosure.

Referring to FIG. 15, a terminal includes a transceiver 1510, a controller 1520 and a memory 1530. The controller 1520 may refer to a circuitry, an ASIC, an FPGA, or at least one processor. The transceiver 1510, the controller 1520 and the memory 1530 are configured to perform the operations of the UE illustrated in the figures, e.g. FIGS. 1, 3, 5 and 8 to 12, or as otherwise described above. Although the transceiver 1510, the controller 1520 and the memory 1530 are shown as separate entities, they may be integrated onto a single chip. The transceiver 1510, the controller 1520 and the memory 1530 may also be electrically connected to or coupled with each other.

The transceiver 1510 may transmit and receive signals to and from other network entities, e.g., a base station.

The controller 1520 may control the UE to perform functions according to the embodiments described above. For example, the controller 1520 is configured to receive information on a number N of PFs in a DRX cycle in SIB1 from a base station via the transceiver 1510. The controller 1520 is configured to identify at least one PF based on the number of PFs, and receive at least one paging message in the at least one PF from the base station via the transceiver 1510.

In an embodiment, the operations of the terminal may be implemented using the memory 1530 storing corresponding program codes. Specifically, the terminal may be equipped with the memory 1530 to store program codes implementing desired operations. To perform the desired operations, the controller 1520 may read and execute the program codes stored in the memory 1530 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
   identifying a search space configuration for paging;
   identifying synchronization signal (SS)/physical broadcast channel (PBCH) block (SSB) and control resource set (CORESET) multiplexing pattern;
   determining a number of paging frames (PFs) in a discontinuous reception (DRX) cycle from a set determined based on the search space configuration for paging or based on the search space configuration for paging and the SSB and the CORESET multiplexing pattern;
   transmitting, to a terminal, information on paging search space and information on the number of PFs, wherein the information on paging search space indicates the search space configuration for paging;
   identifying at least one PF based on the number of PFs; and
   transmitting, to the terminal, a paging message on a physical downlink control channel (PDCCH) for paging in paging occasions of the at least one PF.

2. The method of claim 1,
   wherein the number of the PFs is determined from a first set of {T, T/2, T/4, T/8, T/16} in case that the information on the paging search space indicates a search space configuration other than search space configuration zero, and
   wherein the search space configuration zero indicates PDCCH monitoring occasions for paging are same as for system information block 1 (SIB1) and T is the DRX cycle of the terminal.

3. The method of claim 1,
   wherein the SSB and CORESET multiplexing pattern is identified in case that the information on the paging search space indicates search space configuration zero, and
   wherein the search space configuration zero indicating that PDCCH monitoring occasions for paging are same as for system information block 1 (SIB1).

4. The method of claim 1, wherein the number of the PFs is determined from a second set of {T/2, T/4, T/8, T/16} in case that the information on the paging search space indicates search space configuration zero and the SSB and CORESET multiplexing pattern is 1, and
   wherein the search space configuration zero indicating that PDCCH monitoring occasions for paging are same as for system information block 1 (SIB1) and T is the DRX cycle of the terminal.

5. The method of claim 1, further comprising:
   identifying periodicity of SSBs transmitted in a serving cell in case that the information on the paging search space indicates search space configuration zero and the SSB and CORESET multiplexing pattern is 2 or 3,
   wherein the search space configuration zero indicating that PDCCH monitoring occasions for paging are same as for system information block 1 (SIB1).

6. The method of claim 1,
   wherein the number of the PFs is determined from a first set of {T, T/2, T/4, T/8, T/16} in case that the information on the paging search space indicates search space configuration zero, the SSB and CORESET multiplexing pattern is 2 or 3, and periodicity of SSBs transmitted in a serving cell is 5 or 10 ms,
   wherein the number of the PFs is determined from a second set of {T/2, T/4, T/8, T/16} in case that the information on the paging search space indicates the search space configuration zero, the SSB and CORESET multiplexing pattern is 2 or 3, and the periodicity of the SSBs is 20 ms, wherein the number of the PFs is determined from a third set of {T/4, T/8, T/16} in case that the information on the paging search space indicates the search space configuration zero, the SSB and CORESET multiplexing pattern is 2 or 3, and the periodicity of the SSBs is 40 ms, wherein the number of the PFs is determined from a fourth set of {T/8, T/16} in case that the information on the paging search space indicates the search space configuration zero, the SSB and CORESET multiplexing pattern is 2 or 3, and the periodicity of the SSBs is 80 ms, wherein the number of the PFs is determined as T/16 in case that the information on the paging search space indicates the search space configuration zero, the SSB and CORESET multiplexing pattern is 2 or 3, and the periodicity of the SSBs is 160 ms, and wherein the search space configuration zero indicating that PDCCH monitoring occasions for paging are same as for system information block 1 (SIB1) and T is the DRX cycle of the terminal.

7. A base station in a wireless communication system, the base station comprising:
a transceiver; and
at least one processor coupled with the transceiver and configured to:
identify a search space configuration for paging,
identify synchronization signal (SS)/physical broadcast channel (PBCH) block (SSB) and control resource set (CORESET) multiplexing pattern,
determine a number of paging frames (PFs) in a discontinuous reception (DRX) cycle from a set determined based on the search space configuration for paging or based on the search space configuration for paging and the SSB and the CORESET multiplexing pattern,
transmit, to a terminal, information on paging search space and information on the number of PFs, wherein the information on paging search space indicates the search space configuration for paging,
identify at least one PF based on the number of PFs, and
transmit, to the terminal, a paging message on a physical downlink control channel (PDCCH) for paging in paging occasions of the at least one PF.

8. The base station of claim 7,
wherein the at least one processor is configured to determine the number of the PFs from a first set of {T, T/2, T/4, T/8, T/16} in case that the information on the paging search space indicates a search space configuration other than search space configuration zero, and
wherein the search space configuration zero indicates PDCCH monitoring occasions for paging are same as for system information block 1 (SIB1) and T is the DRX cycle of the terminal.

9. The base station of claim 7,
wherein the SSB and CORESET multiplexing pattern is identified in case that the information on the paging search space indicates search space configuration zero, and
wherein the search space configuration zero indicating that PDCCH monitoring occasions for paging are same as for system information block 1 (SIB1).

10. The base station of claim 7,
wherein the at least one processor is configured to determine the number of the PFs from a second set of {T/2, T/4, T/8, T/16} in case that the information on the paging search space indicates search space configuration zero and the SSB and CORESET multiplexing pattern is 1, and
wherein the search space configuration zero indicating that PDCCH monitoring occasions for paging are same as for system information block 1 (SIB1) and T is the DRX cycle of the terminal.

11. The base station of claim 7,
wherein the at least one processor is configured to identify periodicity of SSBs transmitted in a serving cell in case that the information on the paging search space indicates search space configuration zero and the SSB and CORESET multiplexing pattern is 2 or 3, and
wherein the search space configuration zero indicating that PDCCH monitoring occasions for paging are same as for system information block 1 (SIB1).

12. The base station of claim 7, wherein the at least one processor is configured to:
determine the number of the PFs from a first set of {T, T/2, T/4, T/8, T/16} in case that the information on the paging search space indicates search space configuration zero, the SSB and CORESET multiplexing pattern is 2 or 3, and periodicity of SSBs transmitted in a serving cell is 5 or 10 ms,
determine the number of the PFs from a second set of {T/2, T/4, T/8, T/16} in case that the information on the paging search space indicates the search space configuration zero, the SSB and CORESET multiplexing pattern is 2 or 3, and the periodicity of the SSBs is 20 ms,
determine the number of the PFs from a third set of {T/4, T/8, T/16} in case that the information on the paging search space indicates the search space configuration zero, the SSB and CORESET multiplexing pattern is 2 or 3, and the periodicity of the SSBs is 40 ms,
determine the number of the PFs from a fourth set of {T/8, T/16} in case that the information on the paging search space indicates the search space configuration zero, the SSB and CORESET multiplexing pattern is 2 or 3, and the periodicity of the SSBs is 80 ms, and
determine the number of the PFs as T/16 in case that the search space configuration zero indicating that PDCCH monitoring occasions for paging are same as for system information block 1 (SIB1) and the periodicity of the SSBs is 160 ms, and
wherein T is the DRX cycle of the terminal.

13. A method performed by a terminal in a wireless communication system, the method comprising:
receiving, from a base station, information on paging search space and information on a number of paging frames (PFs) in a discontinuous reception (DRX) cycle, wherein the information on paging search space indicates a search space configuration for paging;
identifying at least one PF based on the number of PFs; and
receiving, from the base station, a paging message on a physical downlink control channel (PDCCH) for paging in paging occasions of the at least one PF,
wherein the number of PFs is identified from a set determined based on the search space configuration for paging or based on the search space configuration for paging and synchronization signal (SS)/physical broadcast channel (PBCH) block (SSB) and control resource set (CORESET) multiplexing pattern.

14. The method of claim 13,
wherein the number of the PFs is identified from a first set of {T, T/2, T/4, T/8, T/16} in case that the information on the paging search space indicates a search space configuration other than search space configuration zero, and
wherein the search space configuration zero indicates PDCCH monitoring occasions for paging are same as for system information block 1 (SIB1) and T is the DRX cycle of the terminal.

15. The method of claim 13,
wherein the number of the PFs is identified from a second set of {T/2, T/4, T/8, T/16} in case that the information on the paging search space indicates search space configuration zero and the SSB and CORESET multiplexing pattern is 1, and
wherein the search space configuration zero indicates that PDCCH monitoring occasions for paging are same as for system information block 1 (SIB1) and T is the DRX cycle of the terminal.

16. The method of claim 13,
wherein the number of the PFs is identified from a first set of {T, T/2, T/4, T/8, T/16} in case that the information on the paging search space indicates search space configuration zero, the SSB and CORESET multiplexing pattern is 2 or 3, and periodicity of SSBs transmitted in a serving cell is 5 or 10 ms,
wherein the number of the PFs is identified from a second set of {T/2, T/4, T/8, T/16} in case that the information on the paging search space indicates the search space configuration zero, the SSB and CORESET multiplexing pattern is 2 or 3, and the periodicity of the SSBs is 20 ms,
wherein the number of the PFs is identified from a third set of {T/4, T/8, T/16} in case that the information on the paging search space indicates the search space configuration zero, the SSB and CORESET multiplexing pattern is 2 or 3, and the periodicity of the SSBs is 40 ms,
wherein the number of the PFs is identified from a fourth set of {T/8, T/16} in case that the information on the paging search space indicates the search space configuration zero, the SSB and CORESET multiplexing pattern is 2 or 3, and the periodicity of the SSBs is 80 ms,
wherein the number of the PFs is identified as T/16 in case that the information on the paging search space indicates the search space configuration zero, the SSB and CORESET multiplexing pattern is 2 or 3, and the periodicity of the SSBs is 160 ms, and
wherein the search space configuration zero indicates that PDCCH monitoring occasions for paging are same as for system information block 1 (SIB1) and T is the DRX cycle of the terminal.

17. A terminal in a wireless communication system, the terminal comprising:
a transceiver; and
at least one processor coupled with the transceiver and configured to:
receive, from a base station, information on paging search space and information on a number of paging frames (PFs) in a discontinuous reception (DRX) cycle, wherein the information on paging search space indicates a search space configuration for paging,
identify at least one PF based on the number of PFs, and
receive, from the base station, a paging message on a physical downlink control channel (PDCCH) for paging in paging occasions of the at least one PF,
wherein the number of PFs is identified from a set determined based on the search space configuration for paging or based on the search space configuration for paging and synchronization signal (SS)/physical broadcast channel (PBCH) block (SSB) and control resource set (CORESET) multiplexing pattern.

18. The terminal claim 17,
wherein the number of the PFs is identified from a first set of {T, T/2, T/4, T/8, T/16} in case that the information on the paging search space indicates a search space configuration other than search space configuration zero, and
wherein the search space configuration zero indicates PDCCH monitoring occasions for paging are same as for system information block 1 (SIB1) and T is the DRX cycle of the terminal.

19. The terminal of claim 17,
wherein the number of the PFs is identified from a second set of {T/2, T/4, T/8, T/16} in case that the information on the paging search space indicates search space configuration zero and the SSB and CORESET multiplexing pattern is 1, and
wherein the search space configuration zero indicates that PDCCH monitoring occasions for paging are same as for system information block 1 (SIB1) and T is the DRX cycle of the terminal.

20. The terminal of claim 17,
wherein the number of the PFs is identified from a first set of {T, T/2, T/4, T/8, T/16} in case that the information on the paging search space indicates search space configuration zero, the SSB and CORESET multiplexing pattern is 2 or 3, and periodicity of SSBs transmitted in a serving cell is 5 or 10 ms,
wherein the number of the PFs is identified from a second set of {T/2, T/4, T/8, T/16} in case that the information on the paging search space indicates the search space configuration zero, the SSB and CORESET multiplexing pattern is 2 or 3, and the periodicity of the SSBs is 20 ms,
wherein the number of the PFs is identified from a third set of {T/4, T/8, T/16} in case that the information on the paging search space indicates the search space configuration zero, SSB and CORESET multiplexing pattern is 2 or 3, and the periodicity of the SSBs is 40 ms,
wherein the number of the PFs is identified from a fourth set of {T/8, T/16} in case that the information on the paging search space indicates the search space configuration zero, the SSB and CORESET multiplexing pattern is 2 or 3, and the periodicity of the SSBs is 80 ms,
wherein the number of the PFs is identified as T/16 in case that the information on the paging search space indicates the search space configuration zero, the SSB and CORESET multiplexing pattern is 2 or 3, and the periodicity of the SSBs is 160 ms, and
wherein the search space configuration zero indicates that PDCCH monitoring occasions for paging are same as for system information block 1 (SIB1) and T is the DRX cycle of the terminal.

* * * * *